United States Patent
Allen et al.

(10) Patent No.: US 7,546,372 B2
(45) Date of Patent: Jun. 9, 2009

(54) SYSTEM AND METHOD FOR PROVIDING TO MULTIPLE USER COMPUTERS CONCURRENT TELEPHONIC ACCESS TO MULTIPLE REMOTE DEVICES

(75) Inventors: Thomas H. Allen, Boise, ID (US); Gregg Irwin, Nampa, ID (US)

(73) Assignee: iBeam Systems, Inc., Boise, ID (US)

( * ) Notice: Subject to any disclaimer, the term of this patent is extended or adjusted under 35 U.S.C. 154(b) by 1144 days.

(21) Appl. No.: 10/193,352

(22) Filed: Jul. 11, 2002

(65) Prior Publication Data

US 2004/0010541 A1    Jan. 15, 2004

(51) Int. Cl.
G06F 15/16 (2006.01)
H04L 12/66 (2006.01)
H04M 11/04 (2006.01)

(52) U.S. Cl. ........ 709/229; 709/217; 709/218; 709/225; 709/226; 370/355; 370/356; 455/404.1

(58) Field of Classification Search ......... 709/208, 709/217–229, 204–207; 379/102.02, 37–51, 379/43; 455/403, 404.1, 557, 550.1; 370/259–262; 726/1–4
See application file for complete search history.

(56) References Cited

U.S. PATENT DOCUMENTS

| | | | |
|---|---|---|---|
| 5,727,159 A | 3/1998 | Kikinis | 395/200.76 |
| 5,812,776 A | 9/1998 | Gifford | 395/200.47 |
| 5,920,694 A | 7/1999 | Carleton et al. | 395/200.35 |
| 5,940,082 A | 8/1999 | Brinegar et al. | 345/442 |
| 5,970,477 A * | 10/1999 | Roden | 705/32 |
| 6,003,070 A * | 12/1999 | Frantz | 709/238 |
| 6,026,429 A | 2/2000 | Jones et al. | 709/201 |
| 6,052,386 A * | 4/2000 | Achilleoudis et al. | 370/470 |
| 6,052,785 A | 4/2000 | Lin et al. | 713/201 |
| 6,055,575 A | 4/2000 | Paulsen et al. | 709/229 |
| 6,072,780 A | 6/2000 | Johnson, Jr. et al. | 370/260 |
| 6,081,508 A | 6/2000 | West et al. | 370/238 |
| 6,085,101 A | 7/2000 | Jain et al. | 455/500 |
| 6,085,227 A * | 7/2000 | Edlund et al. | 709/228 |
| 6,115,040 A | 9/2000 | Bladow et al. | 345/335 |

(Continued)

FOREIGN PATENT DOCUMENTS

GB    GB 2346716 A    8/2000

(Continued)

OTHER PUBLICATIONS

Mamakos et al. "A Method for Transmitting PPP over Ethernet". RFC 2516, Feb. 1999.*

(Continued)

Primary Examiner—Ario Etienne
Assistant Examiner—Brendan Y Higa
(74) Attorney, Agent, or Firm—Davis Wright Tremaine LLP; George C. Rondeau, Jr.; Heather M. Colburn

(57) ABSTRACT

A method and system for acquiring and managing data from multiple remote devices. A server is programmed to automatically dial and connect to remote devices that are connected to standard phone lines. The invention allows multiple remote user computers to concurrently control and access data supplied by the remote devices over combined computer network and telephone systems.

13 Claims, 9 Drawing Sheets

U.S. PATENT DOCUMENTS

| | | | | |
|---|---|---|---|---|
| 6,141,759 | A | 10/2000 | Braddy | 713/201 |
| 6,144,667 | A | 11/2000 | Doshi et al. | 370/401 |
| 6,145,001 | A | 11/2000 | Scholl et al. | 709/223 |
| 6,151,628 | A | 11/2000 | Xu et al. | 709/225 |
| 6,158,011 | A | 12/2000 | Chen et al. | 713/201 |
| 6,161,182 | A * | 12/2000 | Nadooshan | 713/172 |
| 6,167,449 | A | 12/2000 | Arnold et al. | 709/227 |
| 6,185,194 | B1 | 2/2001 | Musk et al. | 370/260 |
| 6,199,116 | B1 | 3/2001 | May et al. | 709/310 |
| 6,212,640 | B1 | 4/2001 | Abdelnur et al. | 713/201 |
| 6,229,810 | B1 | 5/2001 | Gerszberg et al. | 370/401 |
| 6,266,328 | B1 | 7/2001 | Johnson, Jr. et al. | 370/260 |
| 6,308,213 | B1 | 10/2001 | Valencia | 709/229 |
| 6,317,597 | B1 * | 11/2001 | Baker et al. | 455/426.1 |
| 6,317,793 | B1 * | 11/2001 | Toyosawa | 709/228 |
| 6,321,252 | B1 | 11/2001 | Bhola et al. | 709/204 |
| 6,332,147 | B1 | 12/2001 | Moran et al. | 707/500.1 |
| 6,338,085 | B1 | 1/2002 | Ramaswamy | 709/217 |
| 6,343,255 | B1 | 1/2002 | Peek et al. | 702/3 |
| 6,377,571 | B1 * | 4/2002 | Tai | 370/355 |
| 6,470,453 | B1 * | 10/2002 | Vilhuber | 709/229 |
| 6,480,586 | B1 * | 11/2002 | Hayes et al. | 379/102.02 |
| 6,487,197 | B1 * | 11/2002 | Elliott | 370/354 |
| 6,754,693 | B1 * | 6/2004 | Roberts et al. | 709/205 |
| 7,239,629 | B1 * | 7/2007 | Olshansky et al. | 370/353 |
| 2002/0007422 | A1 * | 1/2002 | Bennett | 709/246 |
| 2002/0087887 | A1 * | 7/2002 | Busam et al. | 713/201 |
| 2002/0147019 | A1 * | 10/2002 | Uhlik et al. | 455/452 |
| 2003/0138093 | A1 * | 7/2003 | Malik | 379/220.01 |

FOREIGN PATENT DOCUMENTS

| | | | |
|---|---|---|---|
| WO | WO 0036812 A | 6/2000 | |

OTHER PUBLICATIONS

"Television Conference System," IBM Technical Disclosure Bulletin, IBM Corp., New York, US, vol. 32, No. 11, Apr. 1, 1990, pp. 379-380.

* cited by examiner

SYSTEM AND METHOD FOR PROVIDING TO MULTIPLE USER COMPUTERS CONCURRENT TELEPHONIC ACCESS TO MULTIPLE REMOTE DEVICES

BACKGROUND OF THE INVENTION

1. Field of the Invention

This invention relates generally to the field of client-server networks and more particularly to systems and methods for access to remote devices through such networks.

2. Description of the Related Art

Conventional techniques exist to connect remote devices across phone lines such as the basic telephone system. Establishing a connection between remote fax machines and between remote computers is more complicated but also well established. However, conventional connection techniques emphasis single connections occurring on separate occasions.

For instance, a local fax machine is limited to a single remote machine connection at a time. Software which enables a local machine to broadcast faxes to multiple remote machines is well known, however, the local machine makes a series of sequential telephone calls, one to each remote machine individually. Consequently, information is transmitted in a single direction, from local to remote machine and received by the remote machine.

Other conventional techniques include a local computer connecting to a remote computer by using a local modem to initiate a dial-up connection to the modem of a remote computer. A point-to-point protocol (PPP) connection is established between the computers and data is transmitted and received bi-directionally.

In order to gain access to multiple computers, the local computer connects to a communication network such as the Internet by dialing the telephone number of the Internet Service Provider (ISP), entering the appropriate account information and gaining access to the ISP's high-speed connection such as a T-1 or T-3 connection. A modem pool is used by the ISP to provide access to the high-speed connection by multiple users dialing in on standard phone lines.

Unfortunately, according to conventional methods, the local computer is limited to maintaining one PPP connection at a time. The PPP connection is primarily used to connect the local computer to the ISP such as America On Line in order to gain access to the Internet. A user wishing to connect to a remote device other than the ISP must disconnect from the ISP, cease the telephone connection, reconfigure the Transmission Control Protocol/Internet Protocol (TCP/IP) protocols of the local computer and initiate a re-dial of a telephone number of the second remote computer. Once connected, the local computer must accurately identify the Internet Protocol (IP) address of the remote computer.

Conventional methods also have demanding configuration requirements; the remote computer must be configured as a server and list the local computer as a qualified user. The remote computer must accurately recognize the IP address of the local computer and reach parity between the local computer and the remote computer before data can be exchanged.

Variations of the single connection schemes exist also with conventional computers using modern operating systems such as Windows or Macintosh operating systems. These operating systems allow multiple dial-up phone numbers to be stored in a directory. Typically, these operating systems do not allow multiple network settings, such as TCP/IP settings, to be saved. Therefore, each connection must be laboriously initiated.

In a typical office setting, multiple computers are connected within a local area network (LAN) to a central modem-router capable of connecting to an ISP in order to connect to the Internet and to receive e-mail. Even if the user's computer is equipped with a modem, it is typically difficult for an individual user to configure their computer to bypass the modem-router and create a direct dial-up connection.

Access to the Internet enables a user to easily connect to remote computers and view information posted on the remote computer's web site. However, concurrent data from multiple remote sources is not obtainable with conventional approaches. Even though the local computer can connect to multiple remote computers via the Internet, data is only transmitted between the local computer and one remote computer at a time. Multiple browser windows may be opened, but data is transmitted by one computer at a time. Furthermore, information residing on one of the remote computers is only immediately accessible if the remote computer is connected to an always-on type connection such as an ISDN or DSL line, and running server software and connected to an ISP. Furthermore, the information residing on the remote computer is only accessible if the computer is connected to an always-on type connection such as an ISDN or DSL line and running server software and connected to an ISP.

Connecting to data sending devices initiated from a communication network such as the Internet is well known. There are many inventions that allow a remote user to access a server programmed to connect to a remote device using a standard phone line.

Some conventional approaches include methods for using hypertext links from a web page to locate other web pages accessible over standard phone lines. Other conventional methods include viewing a remote web site by dialing a remote computer from a web page service provider. Web pages are viewed as static images. New data must be laboriously programmed onto the web page before the new data can be viewed by a remote user.

Conference calls are also well known in the art. Data relative to the conference such as the time elapsed and list of other conference attendees can be displayed on personal computers that are networked. Conventional methods include telephone conferencing systems in which data on conferees' activity relative to the conference is displayed on all networked computers.

A static message can be transmitted to a centralized distribution center and forwarded to multiple recipients in other conventional approaches involving the transmission of a single message to multiple recipients connected to a central message center by differing means.

Initiating a conference call using the Internet is well known. Conventional approaches include using the Internet to initiate voice telephony calls. A singular connection is made between the user and application agent. Other parties may be added to the call via a conference bridge. Some of the conventional methods include initiating a phone call from a personal computer by accessing a call center from the Internet. Others have a telephone conferencing system in which a personal computer is used to initiate a voice conference.

Weather data, such as data for irrigation scheduling, is used by other conventional systems such as those involved with remote weather stations that are contacted by an Internet based data access system utilizing a cellular phone link. Data can be sent to a data access system where it is stored and eventually retrieved by a user over the Internet.

Because of the unique protocols necessary to connect to a remote device from a standard phone line initiated by a central server, conventional systems are not capable of maintaining concurrent connections to multiple sites. These conventional systems are limited to accessing the remote devices one at a time. Likewise, data from multiple remote devices cannot be accessed concurrently by multiple systems being operated by multiple users.

Data from multiple sites is typically collected sequentially from individual devices and stored on a central database. This database can then be accessed from a server at the request of users using computers that are connected to the Internet. Even though the database can be simultaneously accessed by multiple users using computers connected to a network, the original data streams from the remote data sites cannot be accessed directly by these network connected computers being used by the multiple users.

In order for a user to expeditiously compare and contrast data, it is necessary for the user's computer to access concurrent data from multiple remote devices as it is collected.

Other examples of limitations of conventional systems include multiple independent systems that are in modern buildings such as elevator controllers, fire alarm panels, air control dampers, and emergency electrical power systems. These systems send data over a standard phone to remote users connected to the Internet. The data would be more, however, if, unlike prior art capabilities, the data could be accessed and managed by users of multiple remote devices as the data is collected.

BRIEF SUMMARY OF THE INVENTION

DETAILED DESCRIPTION OF THE INVENTION

Figure 1:
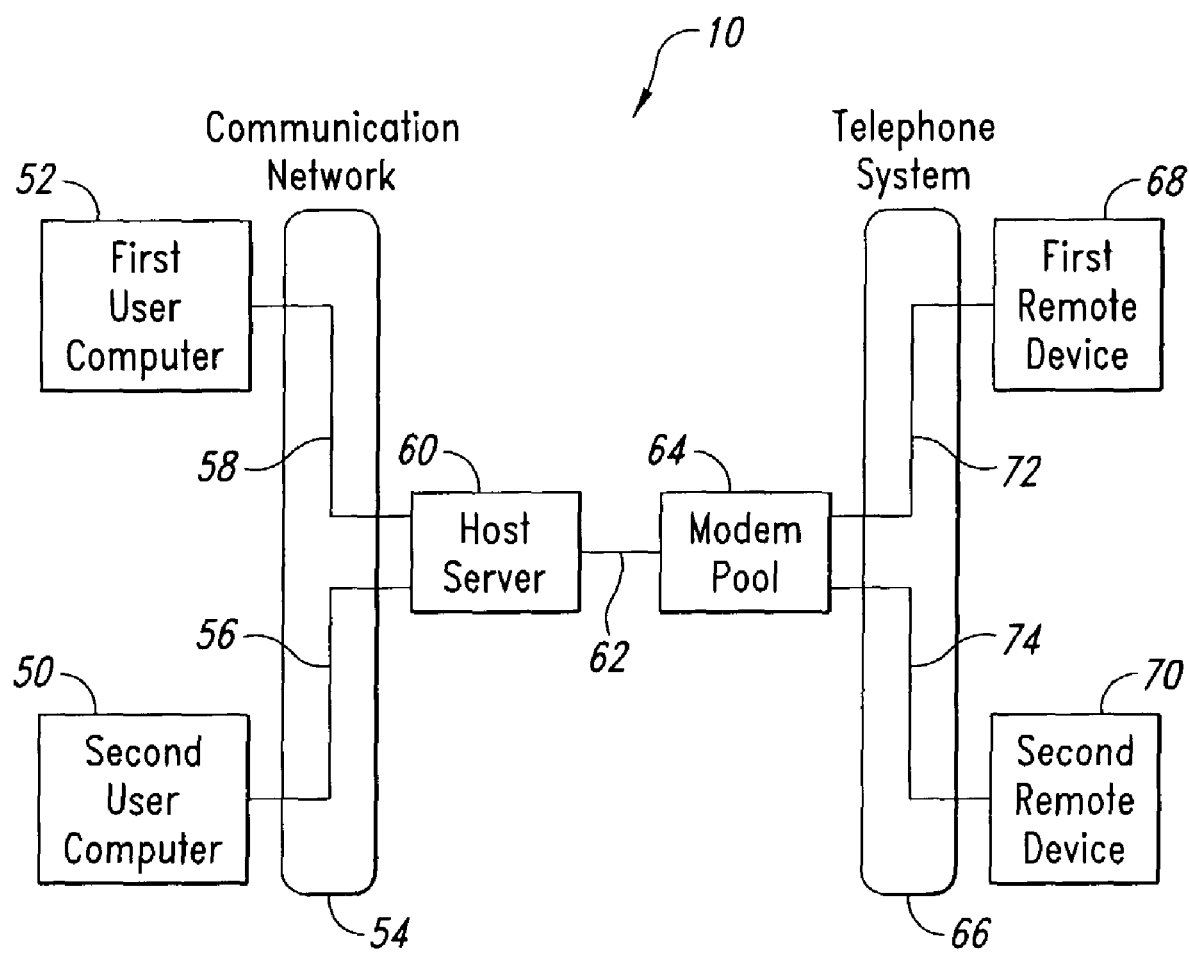
FIG. 1 is a schematic diagram illustrating an embodiment of a system to provide telephonic access to multiple remote devices for one or more user computers.

Access to multiple remote devices connected to standard telephone lines is provided concurrently to a plurality of users and user computers accessing the Internet.

A host server is generally comprised of a host modem pool connected to multiple telephone lines and a host computer connected to the Internet with a standard network connection. The host computer and host modem pool are connected by a computer-modem pool communication connection.

Distributed user computers are connected to the host server using a communication network such as the Internet. Distributed remote devices are connected by separate device modems through standard telephone lines to the host modem pool, which in turn is connected to the host server. A user communication connection between the distributed user computers and the host server sends data between the distributed computers and the host server. A device communication connection between the device modem and the host modem pool sends data between the remote devices and the host computer. A user-device communication link is therefore established between the user computers and the remote devices.

Host server software running on the host server computer is programmed to recognize a unique user name and password assigned to each user. A user may access the host server using any distributed user computer connected to the Internet.

The host server software is programmed to locate a predetermined telephone number and IP address that has been assigned to each remote device. The remote device, therefore, is accessed over a standard telephone line in the public switched telephone network.

The host server software is programmed to respond to requests from one or more programs on one or more user computers and activate the host modem pool. The activated host modem pool establishes a telephonic communication link such as a PPP connection with a remote device associated with the request. The host modem pool dials a predetermined phone number of a requested device modem. The host server software identifies the unique predetermined network address, such as an IP address, assigned to the remote device to establish a network connection, such as a standard PPP connection between the host computer and the desired remote device. Data from the remote device is sent through the device communication connection to the host server and through the user communication connection to the user computer. Data from the remote device is therefore accessible by the user computer through the user-device communication link. Operation requests can also be sent from the user computer to the remote device to request data or to control the remote device in other ways.

The host server modem pool is connected to multiple standard telephone lines. Each telephone line is capable of maintaining a device communication connection to a single remote device. The host server software is programmed to maintain multiple data communication connections between the host modem pool and multiple remote devices. The data from a plurality of remote devices is therefore concurrently accessible to the host server. The data from the plurality of remote devices is sent from the host server to the user computer. Therefore, data from multiple remote devices is concurrently accessible to a user maintaining a user communication connection to the host server.

The host server software is programmed to maintain multiple user communication connections with remote computers over the communication network and to maintain multiple device connections including concurrent data streams. Data from a plurality of remote devices is therefore concurrently accessible to a plurality of user computers irrespective of user computer location. This access, however, can be limited to match designated of the plurality of user computers with designated of the plurality of remote devices.

Remote devices can be identified by unique telephone numbers for use with telephone networks. The remote devices can also be identified by unique network addresses, such as an IP address, for use with a computer network, such as a Local Area Network (LAN). For instance, one of the multiple remote devices may operate as a server within a Local Area Network such as within a network of distributed remote devices.

Communication links between the multiple user computers and the host server are maintained through computer networks, such as the Internet, private Wide-Area-Network (WAN), or through direct connections, such as broadband connection or direct dial-up PPP connections. One of the multiple user computers may operate as a server within a Local Area Network (LAN) such as within a network of distributed user computers.

The terms Uniform Resource Locator (URL) and IP address refer to an Internet based addressing and locating system. A URL is the text equivalent of the numerical IP address. Therefore, the terms are used interchangeably.

Modem modulation and demodulation as well as error correcting protocols are well known in the industry and are not described herein in detail, yet modem operation is well within the scope of the described systems and method.

Operation Overview

Referring to FIG. 1, there is illustrated a system for providing concurrent telephone line connections to multiple remote devices from a central host server accessible over a communications network such as the Internet in accordance with the present invention, generally designated as 10.

User computers, such as first and second user computers 50 and 52, respectively, are programmed with an operating system configured to access a communication network 54 such as the Internet with a first and second user connections 56 and 58, respectively. The user connections 56 and 58 can include, but are not limited to, digital cellular connections, digital subscriber line (DSL) connections, broadband connections, or other known connections.

A host server 60 running connection oriented software then establishes connections through a host-pool link 62, through a modem pool 64, and through a telephone system 66 to first and second remote devices, 68 and 70, respectively. The remote devices 68 and 70 are connected to the telephone system 66 via first and second remote connections 72 and 74, respectively.

Dial-Up Connection

In a depicted implementation, a dial-up user computer 106 (FIG. 2), is programmed with a first operating system such as MAC OS 9 or Windows 2000 which is configured to initiate a dial up connection on a first standard telephone line 110 connected to a public switched telephone network 112. The dial-up user computer 106 is connected to a dial-up user modem 114 with a first computer-modem communication link 116 well known in the industry such as an Ethernet connection, wireless connection, or internal modem inside the dial-up user computer. The dial-up user modem 114 is connected to the first standard telephone line 110 in the public switched telephone network 112. In the depicted implementation, the dial-up user computer 106, running a dial-up user program 118, initiates a connection to a communication network 104 (such as with a Wide Area Network (WAN) or the Internet) by requesting the dial-up user modem 114 to open the first standard phone line 110 and acquire a first dial tone. The dial-up user program 118 is configured to initiate a first dial-up sequence and dial a first unique telephone number of a dial-up Internet Service Provider (ISP) 126 establishing a first dial-up telephone phone call 128 (shown in FIGS. 3 and 7).

In this depicted implementation, the dial-up ISP 126 is comprised of a dial-up ISP modem pool 130 given the first unique telephone number and connected to a first set of standard telephone lines in the public switched telephone network 112. The dial-up ISP modem pool 130 is programmed to answer a first incoming dial-up user phone call such as the first dial-up telephone call 128 initiated by the dial-up user modem 114 and connect to the dial-up user modem 114 in conformance with industry standards. The dial-up ISP modem pool 130 is connected by a first computer-modem pool communication link 136 to a dial-up ISP server computer 138 running server software such as Apache, Linux or other server software known by one skill in the art. In this implementation, the dial-up server computer 138 is communicatively linked to a first broadband connection 140 such as a T-1 or T-3 line providing high-speed data access to the communication network 104 such as the Internet. Other systems for communicatively linking user computers to a computer network can be used in other implementations and include wireless based access systems.

The dial-up user modem 114 dials the first unique telephone number of the dial-up ISP modem pool 130. The dial-up ISP modem pool 130 is programmed to answer the first dial-up telephone call 128. The dial-up user modem 114 is programmed to connect to the dial-up ISP modem pool 130 in conformance with industry standards. The dial-up user computer 106 is programmed with a specific first set of access information such as associated with a dial-up user computer TCP/IP protocol stack including a dial-up user name and a dial-up user password necessary to access a dial-up Internet account held by a dial-up user and provided by the dial-up ISP 126. The dial-up ISP server computer 138 is programmed to recognize the first set of access information, gives the dial-up user computer 106 a first dynamic IP address and establishes a first PPP connection 156 (shown in FIG. 3) between the dial-up user computer 106 and the dial-up ISP server computer 138 in accordance with industry standards. A dial-up user communication link is therefore established between the dial-up user computer 106 and the dial-up ISP server computer 138. The dial-up ISP server computer 138 is programmed to connect the dial-up user computer 106 to the first broadband connection 140. The dial-up user computer 106 therefore is connected to the communication network 104 such as the Internet.

The dial-up user computer 106 sends a first set of dial-up user data 160 over the first computer-modem communication link 116 such as a first search URL request 161 (shown in FIG. 3) which is transmitted by the dial-up user modem 114 over the first standard telephone line 110 in the public switched telephone network 112 to the dial-up ISP modem pool 130. The dial-up ISP modem pool 130 transmits a second set of dial-up user data that corresponds to the first set of data 106 over the first computer-modem pool communication link 136 to the dial-up ISP's server computer 138, which sends a third set of dial-up user data that corresponds to the second set of data over the first broadband connection 140 to the communication network 104 such as the Internet.

Digital Cellular Network Connection

In another depicted implementation, a digital cellular user computer 166 (FIG. 2), as a personal digital device (PDA) such as a Palm Pilot with a second operating system such as Palm OS that is configured to initiate a digital cellular connection on a digital cellular network 170 such as provided by Verizon or Earthlink or other cellular system providers. The digital cellular user computer 166 is connected to a digital cellular user modem 172 with a second computer-modem communication link 174 well known in the industry. The digital cellular user computer 166 running a digital cellular user program 176 initiates a connection to a communication network 104 such as the Internet by requesting the digital cellular user modem 172 to connect to a digital cellular network 170. The digital cellular user program 176 is configured to initiate a second dial-up sequence 178 and dial a second unique telephone number of a digital cellular Internet Service Provider (ISP) 182, establishing a first digital cellular telephone call 184 (shown in FIG. 3).

The digital cellular ISP 182 is comprised of a digital cellular ISP modem pool 186 that is assigned the second unique telephone number. The digital cellular ISP modem pool 186 is connected to a digital cellular telephone call receiver 188 as is well known in the industry and is programmed to answer an incoming digital cellular telephone call such as the first digital cellular telephone call 184 initiated by the digital cellular user modem 172 and connect to the digital cellular user modem in conformance with industry standards. The digital cellular ISP modem pool 186 is connected by a second computer-modem pool communication link 192 to a digital cellular ISP computer 194 running server software such as Apache, Linux or other server software known in the industry. The digital cellular ISP server computer 194 is connected to a second broadband connection 196 such as a T-1 or T-3 line providing high-speed data access to the communication network 104 such as the Internet.

The digital cellular user modem 172 dials the second unique telephone number of the digital cellular ISP modem pool 186. The digital cellular ISP modem pool 186 is programmed to answer an incoming digital cellular telephone call. The digital cellular user modem 172 is programmed to connect to the digital cellular modem pool 186 in conformance with industry standards.

The digital cellular user computer 166 is programmed with a specific second set of access information, such as associated with a digital cellular user computer TCP/IP protocol stack including a digital cellular user name and a digital cellular user password necessary to access a digital cellular Internet account held by a digital cellular user provided by the digital cellular ISP 182. The digital cellular ISP computer 194 is configured to recognize the second set of access information, gives the digital cellular user computer 166 a second dynamic IP address and establishes a second PPP connection between the digital cellular user computer 166 and the digital cellular ISP computer 194 in accordance with industry standards. A digital cellular communication link is therefore established between the digital cellular user computer 166 and the digital cellular ISP computer 194.

The digital cellular ISP computer 194 is programmed to connect the digital cellular user computer 166 to the second broadband connection 196. The digital cellular user computer 166 therefore is connected to the communication network 104.

The digital cellular user computer 166 sends a first set of digital cellular data over the second computer-modem communication link 174 such as a second search URL request 217 (shown in FIG. 3), which is transmitted by the digital cellular user modem 172 over the digital cellular network 170 to the digital cellular ISP modem pool 186. The digital cellular ISP modem pool 186 transmits a second set of digital cellular data over the second computer-modem pool communication link 192 to the digital cellular ISP computer 194, which sends a third set of digital cellular data over the second broadband connection 196 to the communication network 104.

Additional connection configurations between the user computers and the Internet, such as DSL connections and ISDN connections, are well known and are within the scope of other implementations.

Direct Dial-Up Connection

In another depicted implementation, a direct dial-up user computer 222 (shown in FIG. 2), is programmed with a third operating system such as MAC OS 9 by Apple Computer, or Windows NT, Windows 2000, Windows Me, Windows 98SE, Windows XP by Microsoft Corporation, which is configured to initiate a direct dial-up connection on a second standard telephone line 226 of the public switched network 112. The direct dial-up user computer 222 is connected to a direct dial-up user modem 228 with a third computer-modem communication link 230 as is well known in the industry. The direct dial-up user modem 228 is connected to the second standard telephone line 226 in the public switched telephone network 112. The direct dial-up user computer 222 running a direct dial-up user program 232 initiates a direct dial-up connection by requesting the direct dial-up user modem 228 to open the second standard telephone line 226 and acquire a second dial tone. The direct dial-up user program 232 is configured to initiate a third dial-up sequence and dial a third unique telephone number of a host server 242 establishing a direct dial-up telephone call 244 (shown in FIG. 3).

The host server 242 is comprised of a host modem pool 246 that is connected to a second set of standard telephone lines 248 (including the second standard telephone line 226) in the public switched telephone network 112 and is programmed to answer an incoming direct dial-up telephone call. The host modem pool 246 is programmed to connect to the direct dial-up user modem 228.

The host modem pool 246 is comprised of a plurality of telephone line sockets 252. Each telephone line socket 252 is assigned a unique host modem telephone number and connected to one of the second set of standard telephone lines 248. For instance, a first telephone line socket 260 of the plurality of telephone line sockets 252 is assigned a first unique host modem telephone number and is connected to a first host modem telephone line 264 of the second set of standard telephone lines 248. A second telephone line socket 266 is assigned a second unique host modem telephone number and connected to a second host modem telephone line 270, and so on. The host modem pool 246 is programmed to answer the direct dial-up telephone call 244 initiated by the direct dial-up user modem 228. The direct dial-up user modem 228 is programmed to connect to the host modem pool 246 in conformance with industry standards.

The host modem pool 246 is connected to a host server computer 272 with a third computer-modem pool communication link 274 well known in the industry. The host server computer 272 runs server software such as Apache, Microsoft Server and other server software known in the industry.

The direct dial-up user computer 222 is programmed with a specific third set of access information, such as based upon a direct dial-up user computer TCP/IP protocol stack, a direct dial-up user name, and a direct dial-up user password necessary to access a host server dial-up account held by a direct dial-up user and assigned by the host server 242. The host server computer 272 is programmed to recognize the third set of access information and establishes a third PPP connection between the direct dial-up user computer 222 and the host server computer 272 in accordance with industry standards. A third dynamic IP address is then assigned to the direct dial-up computer 222 by the host server computer 272. A direct dial-up user communication link 292 (shown in FIG. 3) is therefore established between the direct dial-up user computer 222 and the host server computer 272.

The direct dial-up user computer 222 sends a first set of direct dial-up data over the third computer-modem communication link 230, which is transmitted by the direct dial-up user modem 228 over the second standard telephone line 226 in the public switched telephone network 112 to the host modem pool 246 which sends a second set of direct dial-up data over the third computer-modem pool communication link 274 to the host server computer 272.

Direct Broadband Connection

In another implementation, a broadband user computer 298 communicates with the host server computer 272 over a third broadband connection 300 and the communication network 104. A broadband user computer 298 runs a fourth operating system such as MAC OS 9 or Windows 2000, or other operating system known in the art. In some embodiments, the third broadband connection 300 is a T-1 or T-3 line using an appropriate protocol such as point-of-presence (POP). The broadband user computer 298 running a broadband user program 302 initiates a Uniform Resource Locator (URL) search and establishes a broadband communication link 306 (shown in FIG. 3) to a unique host URL address.

The host server computer 272 is assigned the unique host URL address and is connected to a fourth broadband connection 310 such as a T-1 or T-3 line providing high-speed data access to the communication network 104. In other embodiments, other connections of the host server computer to the communication network are used, such as dial-up, wireless, digital cellular, satellite link, or broadband cable modem. As a result, the broadband user computer 298 can be communicatively linked to the host server computer 272, for instance, via a T-1 or T-3 connection from the broadband user computer 298 to the Internet, and a T-1 or T-3 connection from the Internet to the host server computer 272. The host server computer 272 is programmed to accept an incoming broadband connection 314 from the communication network 104. The broadband user computer 298 sends a first set of broadband data over the broadband communication link 306 to the host server computer 272. A broadband user communication link is therefore established between broadband user computer 298 and the host server computer 272.

Furthermore, known systems and methods for communicatively linking multiple user computers connected within a local area network (LAN) involving synchronous, asynchronous, other direct connections, Ethernet IEEE 802, other packet-based networks, or wireless computer communications to the Internet or private WANs with devices such as modems or routers are incorporated for use with some implementations. Therefore, in some implementations one or more of the user computers shown in FIG. 2, can operate as user servers within a Local Area Network (LAN) of other user computers to connect multiple user computers within the LAN to the communication network 104, to the host modem pool 246, and/or to the host server computer 272.

A user-host server communication link 311 (shown in FIG. 3) between multiple user computers (including the dial-up user computer 106, the digital cellular user computer 166, the direct dial-up user computer 222, and the broadband user computer 298) and the host server computer 242 can therefore be established accordingly.

The host server computer 272 is running a host server program 320 on which specific set of user access information is programmed. The host server program 320 is configured to send user requests for specific sets of user access information to the user computers. A user program, such as the dial-up user program 118, the digital cellular user program 176, the direct dial-up user program 232, and the broadband user program 302, running on one of the user computers such as the dial-up user computer 106, the digital cellular user computer 166, the direct dial-up user computer 222, and the broadband user computer 298, respectively, is configured to display the user request on the user computer. A user such as a dial-up user, a digital cellular user, a direct dial-up user, and a broadband user, selects a unique user name and a unique user password. The unique user name and password may or may not be similar to the account user names and passwords used to access an ISP account or direct dial-up account. The user operates their user computer to send a user response of the specific set of user access information such as their unique user name and their unique user password to the host server computer 272. Consequently, the host server program 320 can readily identify a user and allow appropriate access to the host server computer 272.

Initiating a Dial-Out Connection from the Host Server

Figure 2:
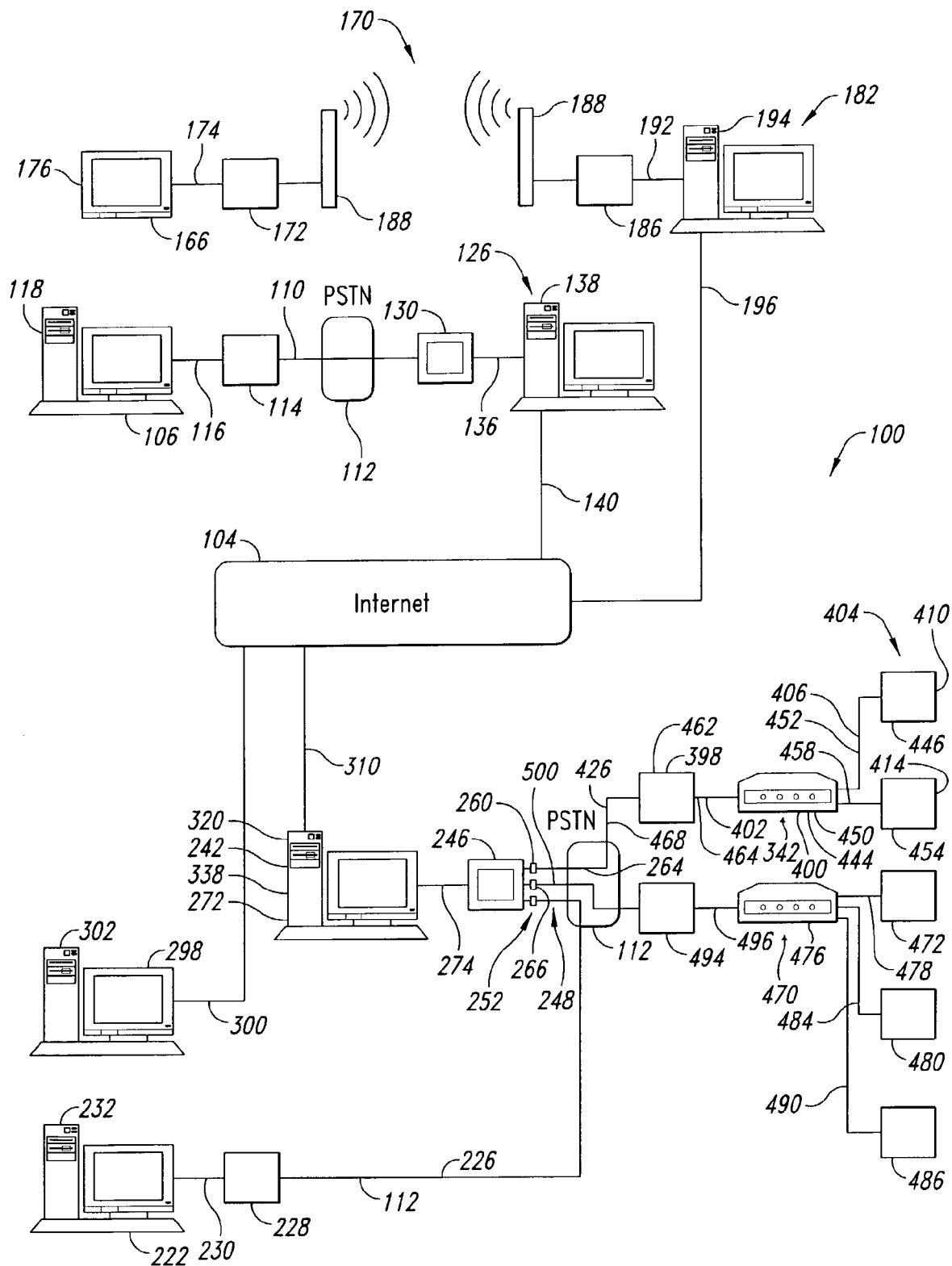
FIG. 2 is schematic diagram illustrating exemplary approaches to link user computers and remote computers to the system as illustrated in FIG. 1.
Figure 3:
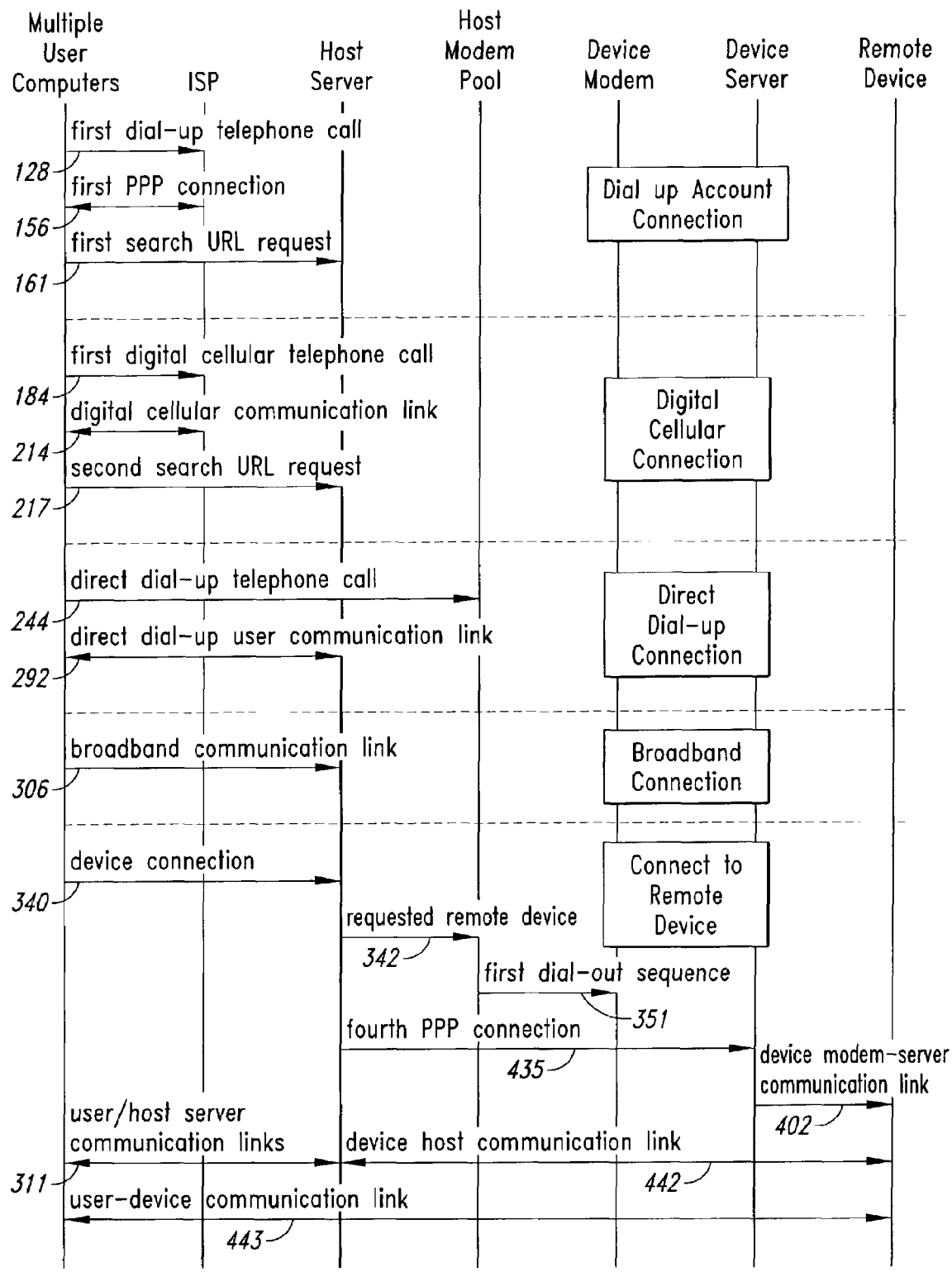
FIG. 3 is a diagram illustrating exemplary communication between user computers, remote devices, and the system as illustrated in FIG. 1.
Figure 4:
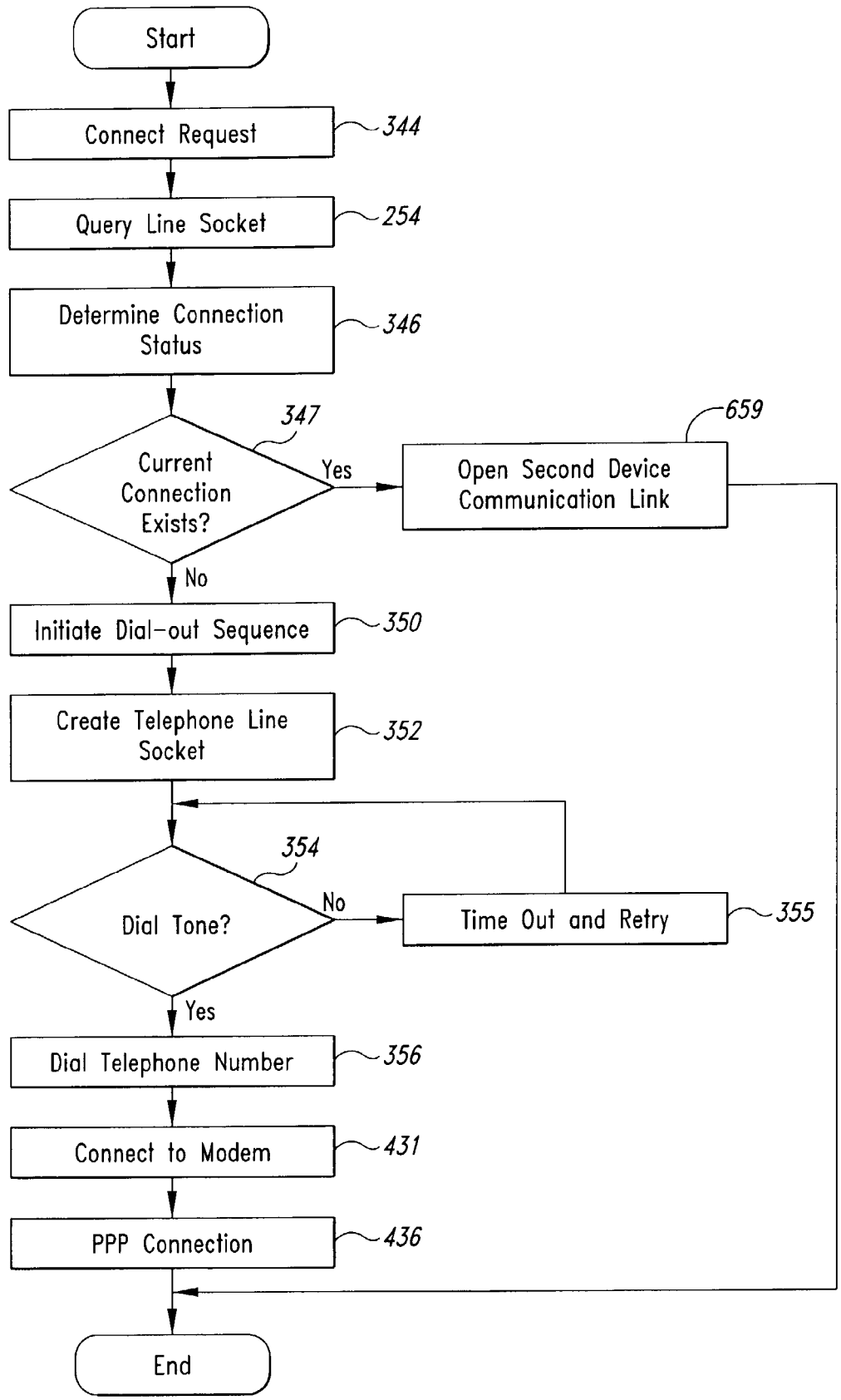
FIG. 4 is a flow chart illustrating an exemplary method for connection establishment for a user computer.
Figure 5:
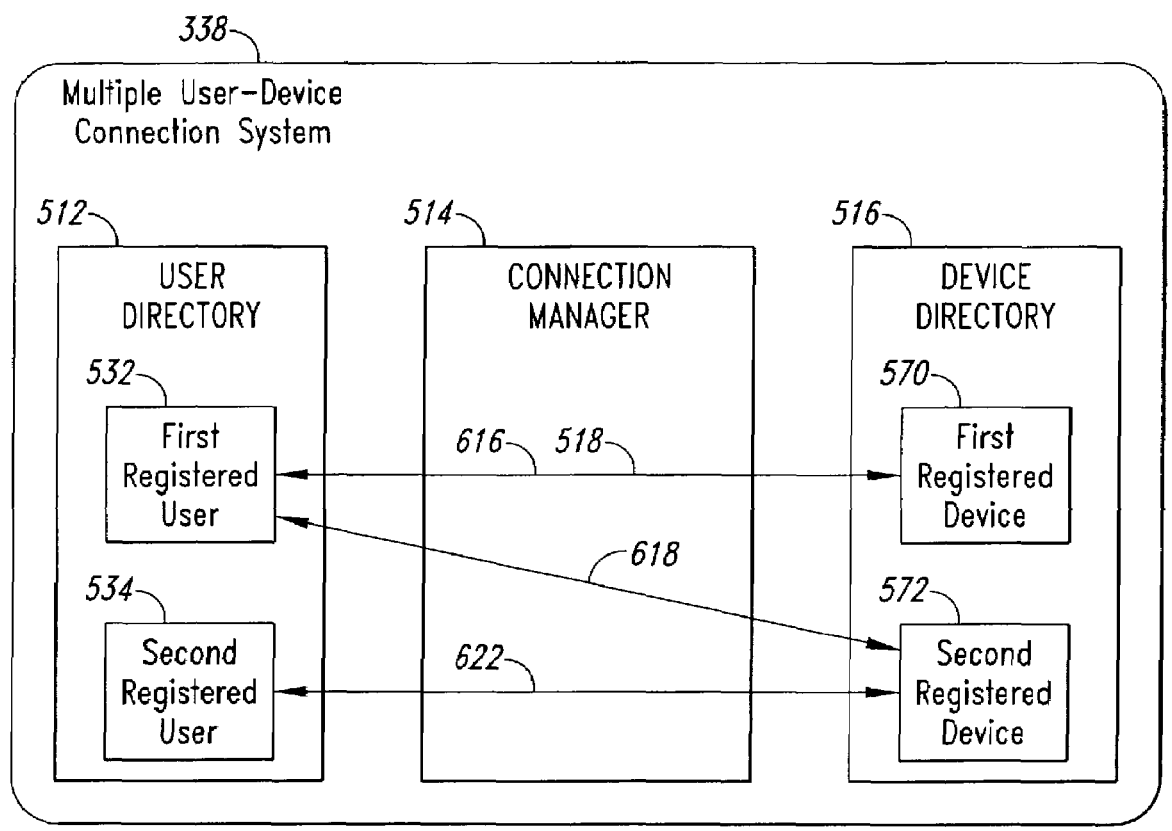
FIG. 5 is an exemplary schematic diagram illustrating communication links established through an exemplary multiple user device connection of the system as illustrated in FIG. 1.
Figure 6:
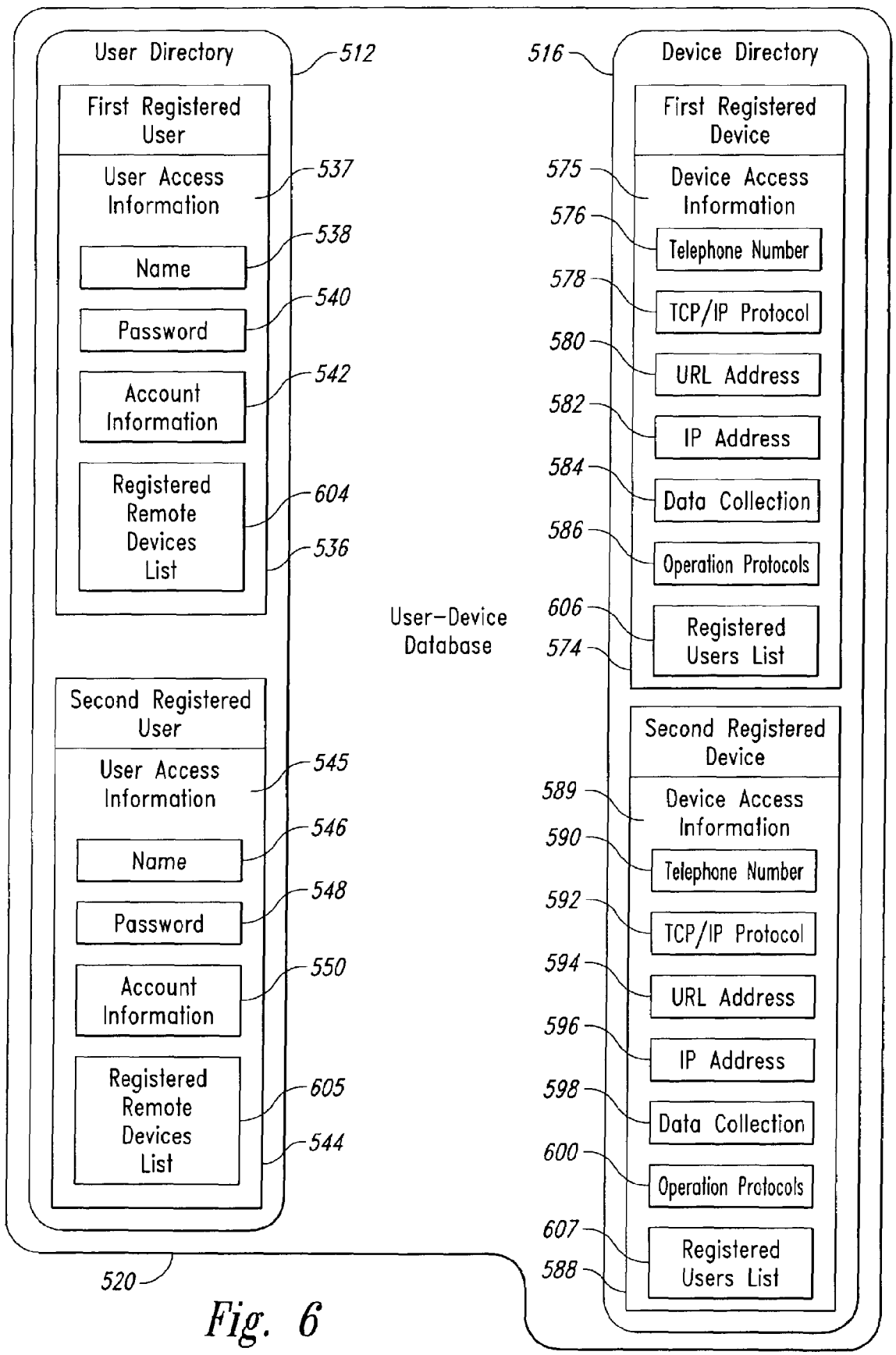
FIG. 6 is an exemplary schematic illustrating a user device database of the system as illustrated in FIG. 5.

The host server program 320 running on the host server computer 272 is programmed with a multiple user-device connection system 338 (as shown in FIGS. 2, 5 and 6). An implementation of the connection system 338 executes a method involving connection initiation described in general terms according to the method illustrated in FIG. 4 to be implemented using the various protocols, languages, and techniques available to those skilled in the art.

According to this implementation, the connection system 338 is configured to initiate a device-host communication link 442 (shown in FIG. 3) to a requested remote device 342 when a device connection request 340 (shown in FIG. 3) is received from a user computer (step 344 of FIG. 4).

The connection system 338 is programmed to send queries 342 (shown in FIG. 3) to each telephone line socket 252 of the host modem pool 246 (step 254) to determine the connection status (step 346) of each individual host modem telephone line of the second set of standard telephone lines 248. If a current connection does not exist 347 ("No" branch of decision step 347), a first available telephone line is found and the connection system 338 initiates a first dial-out sequence (step 350) shown as first dial-out sequence 351 in FIG. 3. The connection system 338 activates a first available telephone line socket (step 352) to open the first available standard telephone line. If a third dial tone is acquired ("Yes" branch of decision step 354), the connection system 338 is configured to dial a fourth unique telephone number (step 356) assigned to the requested remote device 342 establishing a first dial-out telephone call. Otherwise, ("No" branch of decision step 354), a time out is reached (step 355) and the method returns to decision step 354. A computer-telephone line communication connection is therefore established between the host server computer 272 and the first available standard telephone line.

In an alternate implementation, the host server modem pool 246 is a digital cellular modem pool programmed to initiate a digital cellular telephone call. In this implementation, the host server modem pool 246 is connected to a digital cellular transmitter-receiver (not shown) programmed to send and receive individual digital cellular telephone calls within the digital cellular network 170. The host server modem pool 246 is comprised in this case of a plurality of digital cellular telephone sockets known in the art. Each individual digital cellular telephone socket is assigned a unique cellular telephone number.

In this alternative implementation, the connection system 338 is programmed to query each individual digital cellular telephone socket of the host server modem pool 246 to determine connection status of each socket. When a first available digital cellular telephone socket is found, the connection system 338 initiates a first digital cellular dial-out sequence to activate the first available digital cellular telephone socket. The connection system 338 is configured to dial a fifth unique telephone number assigned to the requested remote device 342 by activating the digital cellular transmitter-receiver and establishing a first dial-out cellular telephone call. A computer-digital cellular telephone communication connection is therefore established between the host server computer 272 and a first available digital cellular telephone connection.

The Remote Device

The requested remote device 342 shown in FIG. 2, is comprised of a device modem 398 connected to a device server 400 with a device modem-server communication link 402 (shown also in FIG. 3) well known in the industry such as an Ethernet connection, wireless connection, or the device modem is mounted in the appropriate server slot of the device server 400. The device server 400 is assigned a unique device server IP address and connected to multiple connected devices 404 with a server-device communication link 406 such as a Local Area Network (LAN), a serial connection, or other connections well known in the industry. Each of the multiple connected devices 404 is programmed with a unique connected device address such that a first connected device 410 is assigned a first connected device address, a second connected device 414 is assigned a second connected device address, and so on. Consequently, the device server 400 can readily identify each of the multiple connected devices 404 as a first connected device 410, second connected device 414, etc.

The device server 400 is programmed to receive a first set of device data from the first connected devices 410 and to process the first set of device data in accordance with the programming. The device server 400 is further programmed to send a second set of device data corresponding to the first set of device data to the device modem 398 through the device modem-server communication link 402. The device server 400 is likewise programmed to receive a third set of device data from the second connected device 414 and to process the third set of device data in accordance with the programming. The device server 400 is further programmed to send a fourth set of device data corresponding to the third set of device data to the device modem 398 through the device modem-server communication link 402. Data from multiple connected devices 404 is therefore accessible by the device modem 398.

The Device Modem

The device modem 398, best seen in FIG. 2 is connected to a device telephone line 426 in the public switched telephone network 112. The device modem 398 is assigned a unique device telephone number such as the fourth unique telephone number dialed by the host modem pool 246. The device modem 398 is programmed to answer an incoming host server phone call such as the first dial-out telephone call initiated by the first dial-out sequence 351 of the host modem pool 246. The device modem 398 is programmed to initiate a connection (step 431 of FIG. 4) to the host modem pool 246 in conformance with industry standards. The host modem pool 246 is likewise programmed to connect to the device modem 398 in conformance with industry standards.

The host server computer 272 is programmed with a specific host set of access information, such as associated with a host TCP/IP protocol stack necessary to establish a fourth PPP connection 435 (shown in FIG. 3) with the device server 400 (step 436). The device server 400 is programmed to recognize the host set of access information and establish the fourth PPP connection 436 between the host server computer 272 and the device server 400. The device server 400 is likewise programmed with a specific set of device server access information such as associated with a device server TCP/IP protocol stack necessary to establish the fourth PPP connection 436 with the host server computer 272. The host server computer 272 is likewise programmed to recognize the device server access information 438 and establish the fourth PPP connection 436 with the device server 400.

A device-host communication link 442 (shown in FIG. 3) is therefore established between the host server computer 272 and the multiple connected devices 404. The host server computer 272 is programmed to connect the requested remote device 404 to the fourth broadband connection 310. The requested remote device 404 is therefore connected to the communication network 104 such as the Internet and the data accessible to the user computers.

The user-host server communication link 311 establishes the connection between the user computers and the host server 242. The device-host communication link 442 establishes the connection between the requested remote device 342 and the host server 242. A user-device communication link 443 (shown in FIG. 3) is therefore established between the user computers and the requested remote device.

Multiple Remote Devices

Multiple remote devices are connected to individual telephone lines and accessible by the host server as described above. Multiple connected devices are assigned unique device addresses and connected to corresponding device servers with server-device communication links. Each device server is connected to a corresponding device modem with a device modem-server communication link. Each device modem is connected to an individual telephone line and given a unique telephone number.

A first remote device 444 shown in FIG. 2, is comprised of a first connected remote device 446 assigned a first connected remote device address and connected to a first remote device server 450 with a first server-device communication link 452. A second connected remote device 454 is assigned a second connected remote device address and connected to the first remote device server 450 with a second server-device communication link 458. The first remote device server 450 is assigned a first remote device server URL address and connected to a first remote device modem 462 with a first remote device modem-server communication link 464. The first remote device modem 462 is assigned a first remote device modem telephone number and connected to a first remote device telephone line 468 in the public switched telephone network 112.

A second remote device 470 is comprised of a third connected remote device 472 assigned a third connected remote device address and connected to a second remote device server 476 with a third server-device communication link 478. A fourth connected remote device 480 is assigned a fourth connected remote device address and connected to the second remote device server 476 with a fourth server-device communication link. A fifth connected remote device 486 is assigned a fifth connected remote device address and connected to the second remote device server 476 with a fifth server-device communication link. The second remote device server 476 is assigned a second remote device server URL address and connected to a second remote device modem 494 with a second remote device modem-server communication link 496. The second remote device modem 494 is assigned a second remote device modem telephone number and connected to a second remote device telephone line 500 in the public switched telephone network 112.

Therefore, each remote device is uniquely distinguished. The remote modem by a unique telephone number, the remote server by a unique URL address and the connected remote devices by unique device addresses. The host server computer is programmed to recognize each unique telephone number, each unique URL address and each unique device address. The host server computer can therefore locate and connect to each individual remote connected device. Data from each remote connected device is therefore accessible to the host server computer and to all users connected to the host server computer.

The Device

The requested remote device 242 is programmed with a data collection protocol derived to collect a specific data set and an operational protocol derived to operate a functionality set of the remote device 242 such as transmitting the collected data in a specific digital or analog form to the device modem 398, or powering on and off on a predesignated cycle.

The user programs running on the user computers and the host server program 320 are configured to send the specific data collection protocol and the operational protocol to the requested remote device 242 to alter the data collection and operation protocols of the remote device 242. The requested remote device 242 is programmed to respond to the data collection protocol and the operation protocol sent by the host server computer 272 and the user computers.

Remote devices are well known in the industry and include fixed cameras, operable cameras, and remote cameras that transmit and receive radio frequency signals. Image collection devices are connected to an image server programmed to transmit images, such as JPEG or MPEG class images to an image device modem.

Devices also include static sensors well known in the industry programmed to detect changes in acceleration, deflection, torsion, bending, stress, strain, pressure, temperature, or deformation such as in bridges, dams, buildings and the like. Static sensor devices are connected to a sensor server programmed to transmit data packets to a static sensor device modem.

Devices further include dynamic sensors also well known in the industry programmed to collect, compare, and contrast data such as the status of critical building systems during a fire emergency, disasters, and other emergency situations. Dynamic sensors are connected to a sensor server programmed to transmit data packets to a dynamic sensor device modem.

Other devices include weather-monitoring devices including those that monitor temperature, rainfall, wind speed and direction, humidity, barometric pressure, and wind shear.

Other devices include those that monitor geological conditions, such as seismic instruments and those associated with oil, gas, mining and other exploration, acquisition, recovery, transportation, and refinement activities involving natural resources.

Other devices include those that monitor conditions, such as tracking position and number of items of interest related to transportation including as rail, trucking, auto traffic, both commuter and long distance.

Other devices include those that collect biological data regarding various aspects and trends regarding wildlife, forestry projects, and recreational aspects including hunting and fishing activities.

Other devices include those that collect data regarding recreational activities such as those related to hiking, camping, boating, sporting events, community events, fairs, etc.

This enumeration of types and applications of remote devices is not intended to be all-inclusive, but to serve as examples as to the wide breadth possible in application of the connection system to provide access for multiple users and user computers to multiple remote devices configured to collect and transmit data and other information regarding numerous areas of interest.

Furthermore, systems and methods for communicatively linking multiple remote devices connected within a local area network (LAN) involving synchronous, asynchronous, other direct connections, Ethernet IEEE 802, other packet-based networks, or wireless computer communications to a standard telephone line with devices such as modems or routers is also well known and within the scope of this patent.

The Connection Manager

The host server program 320 running on the host server computer 272 is programmed with the multiple user-device connection system 338 (FIG. 5), having a user directory 512, a connection manager 514, and a device directory 516.

In the Multiple User-Device Connection System 338, an association 518 shown in FIG. 5 exists between one of the users or user computers and the host server computer 272 as well as between the requested remote device 342 and the host modem pool 246. For simplicity, the association 518 is shown directly connecting the user computer and the remote device 342.

The user directory 512 and the device directory 516 are separate divisions of a user-device database 520 (shown in FIG. 6) programmed on the host server computer 272 as part of the connection system 338. The user directory 512 is programmed with a unique set of user access information for each individual user obtained by sorting the specific set of user access information sent by the user in response to the user request described above. The user directory 512 is programmed to list a registered user name such as unique user name, a registered user password such as a unique user password and a set of other user access information such as a set of account information to be used by the connection manager 514. Consequently, the connection manager 514 can readily identify each individual user such as a first registered user 532, a second registered user 534, shown in FIG. 5.

The user directory 512 is programmed with a first user data card 536 of the first registered user 532 having access information 537 listing a first registered user name 538, a first registered user password 540 and a first account information 542. The user directory 512 is likewise programmed with a second user data card 544 of the second registered user 534 having access information 545 listing a second registered user name 546, a second registered user password 548, and a second set of account information 550. The user-device database 520 is programmed to compare unique names and unique passwords during a user registration process 552 such as the user response to avoid duplication of unique names or passwords.

The device directory 516 is likewise programmed with a unique set of device access information for each remote device 242 such as; a unique device telephone number (such as the device telephone line), an individual device TCP/IP protocol stack (such as the device server TCP/IP protocol stack), a unique device server URL (such as the device server IP address), and a unique device address (such as the unique connected device address). The device directory 516 is also programmed with a set of other device access information such as an individual data collection protocol (such as the data collection protocols) and an individual device operation protocol (such as the operational protocols) to be used by the connection manager 514. Consequently, the connection manager 514 can readily identify each remote device 242 such as a first registered remote device 570, a second registered remote device 572, shown in FIG. 5.

The device directory 516 is programmed with a first device data card 574 for the first registered remote device 570 having device access information 575 listing a first registered device telephone number 576, a first registered device TCP/IP protocol stack 578, a first registered device server URL address 580, a first set of registered device addresses of connected devices 582, a first registered device data collection protocol 584, and a first registered device operational protocols 586. The user directory 516 is likewise programmed with a second device data card 588 of the second registered remote device 572 having device access information 589 listing a second registered device telephone number 590, a second registered device TCP/IP protocol stack 592, a second registered device server URL address 594, a second registered device addresses of connected devices 596, a second registered device data collection protocol 598, and a second registered device operational protocols 600. The user-device database 520 is programmed to compare unique device telephone numbers and unique device server URL addresses during a device registration process to avoid duplication of unique telephone numbers or device server URL addresses.

The user access information includes a list of specific registered remote devices to which a registered user may connect. For instance, the user access information 537 of the first user data card 536 has a registered remote devices list 604 of devices associated with the first registered user 532 and the user access information 545 of the second user data card 544 has a registered remote device list 605 of devices associated with the second registered user 534. The device access information for each registered remote device likewise includes a list of specific registered users that may be connected to the device (e.g., registered users). The connection manager 514 can therefore match a registered user with a registered device such as matching the first registered user 532 with the first registered device 570. A first registered user-first registered device connection is thereby established between the first registered user 532 and the first registered device 570.

The connection system 338 is programmed to send a registered device list to a user computer being used by a registered user. The list includes each registered remote device to which the user may connect. A user program running on one of the user computers is configured to display the registered device list on a user computer monitor. The user program is programmed to send a user-device connection request such as the device connection request (step 344) to the connection manager 314. The request initiates a device-host communication link as described above as each registered remote device is selected through use of one of the user computers from the device list being displayed on the user computer monitor.

The connection manager 514 is programmed to connect a user computer being used by a registered user with the registered devices associated with the registered user as in the user directory thereby establishing user-device communication links between the user computer of the registered user and the registered devices associated with the registered user. Therefore, if a single registered user is associated with several registered devices such as the first registered device 570 and the second registered device 572 in the user directory 512, the connection manager 514 is programmed to connect a user computer being used by the single registered user computer being used by the registered user to the first registered device 570 and with the second registered device 572. A first user-first device connection 616 shown in FIG. 5 is thereby established between the first user 532 and the first device 570 and a first user-second device connection 618 is established between the first user 532 and the second device 572. The connection manager 514 can therefore provide concurrent access for a user to multiple remote devices.

The connection manager 514 is programmed to connect the registered devices with user computers being used by registered users identified on the registered user lists. Therefore, if for a single registered device such as the second registered device 572, its user list, such as the registered user's list 607, identifies several registered users such as the first registered user 532 and the second registered user 534, as being associated with the second registered device, the connection manager 514 is programmed to connect the second registered device 572 to user computers being used by the first registered user 532 and to the second registered user 534. As further illustrated in FIG. 5 for exemplary purposes, the first user-second device connection 618 is again established between a user computer being used by the first user 532 and the second device 572 and a second user-second device connection 622 is established between a user computer being used by the second user 534 and the second device 572. The connection manager 514 can therefore connect a single remote device to multiple user computers being used by multiple registered users.

Therefore, if multiple users are listed with multiple devices, the connection manager can connect a plurality of user computers being used by a plurality of registered users with a plurality of remote devices.

Managing Multiple Connections

The connection manager 514 is programmed to maintain multiple user-device connections and is programmed to recognize which registered remote devices are connected to the host modem pool 246 and capable of receiving and transmitting data. The connection manager 514 is likewise programmed to recognize which registered users are using user computers that are connected to the user-host server communication link 311 and capable of receiving and transmitting data.

Figure 7A:
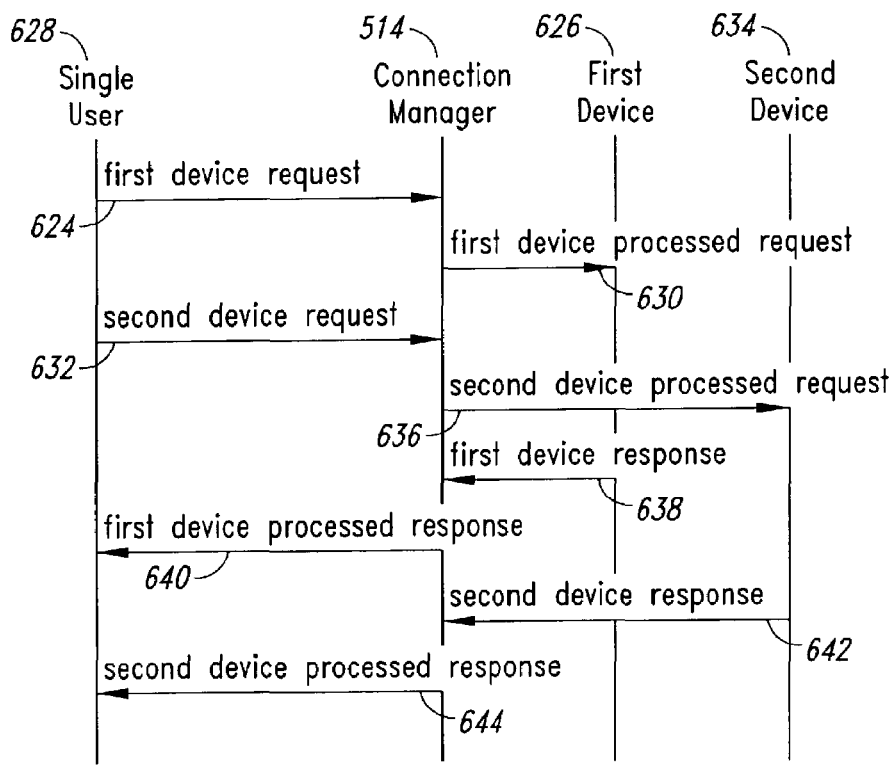
FIG. 7A and 7B are diagrams illustrating exemplary communication between user computers, remote devices, and the system as illustrated in FIG. 5.

An exemplary depiction of the connection manager 514 routing requests and responses between a single user computer being used by a registered user and multiple remote devices is shown in FIG. 7A and FIG.B. A first device request 624 intended for a first device 626 is sent by a single user 628 to the connection system 338 where the first device request 624 is processed by the connection manager 514. The connection manager 514 then sends a first device processed request 630 to the first device 626. A second device request 632 intended for a second device 634 is sent by the single user 628 to the connection system 338 where the second device request 632 is processed by the connection manager 514. The connection manager 514 then sends a second device processed request 636 to the second device 634.

The first device 626 sends a first device response 638 back to the connection manager 514 where the response is processed. The connection manager 514 then sends a first device processed response 640 to the single user 628.

The second device 634 sends a second device response 642 to connection manager 514 where the response is processed. The connection manager 514 transmits a second device processed response 644 to the single user 628 after the first device processed response 640 has been sent from the connection manager 514 to the single user.

The connection manager 514 therefore maintains multiple device connections to a single user. Systems and methods for data management involving synchronous and asynchronous data flow, queuing data on a spooler, and other methods are well known and within the scope of this patent.

Figure 7B:
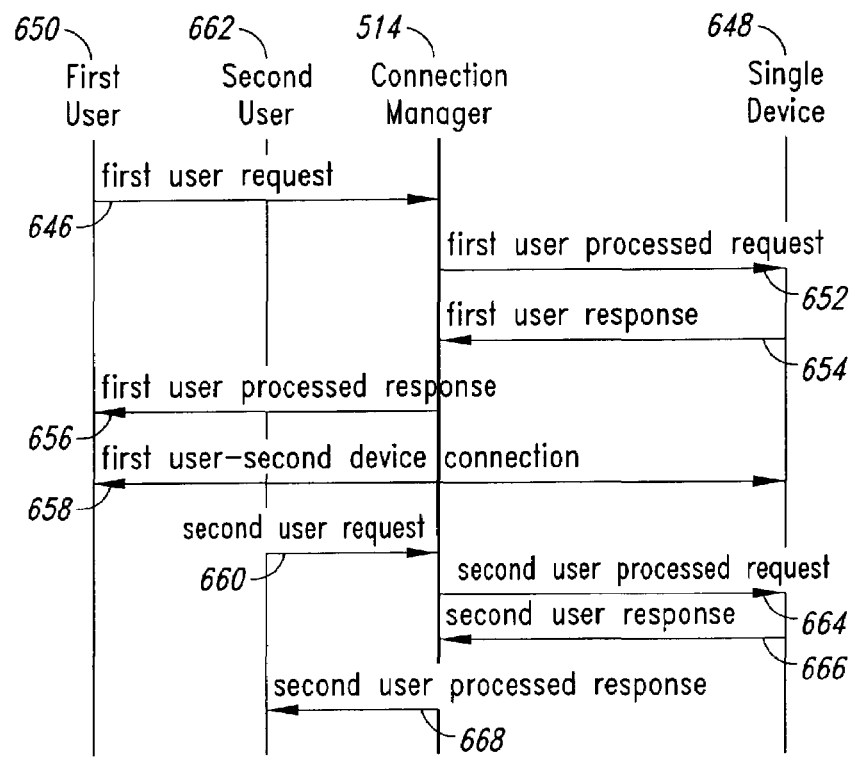

The connection manager 514 routes requests and responses between multiple users and a single remote device as depicted in the exemplary illustration of FIG. 7A and FIG. 7B.

A first user request 646 intended for a second device 648 is sent by a first user 650 to the connection manager 514 where the request is processed. The connection manager 514 then sends a first user processed request 652 to a single device 648. The single device 648 sends a first user response 654 to the connection manager 514 where the response is processed. The connection manager 514 then sends a first user processed response 656 to the first user 646. The connection manager 514 therefore knows the status of a first user-single device connection 658. The connection manager 514 is programmed to open a second device communication connection link to the PPP connection of the requested remote device as described above.

A second user request 660 intended for the single device 648 is sent by a second user 662 to the connection manager 514 where the request 654 is processed.

The connection manager 514 determines that the single device 648 is concurrently connected to the host server modem pool 246. The connection manager 514 transmits a second user processed request 664 to the single device 648 after the first response user 654 has been sent from the second device 648 to the connection manager 514. A second user response 666 from the single remote device 648 is sent back to the connection manager 514 where the response is processed. The connection manager 514 sends a second processed response 668 to the second user 662 after the first user processed response 656 has been sent from the connection manager 514 to the first user 650. The connection manager 514 therefore maintains multiple user connections to a single remote device.

In an alternate implementation, a cache memory chip is installed in the host server computer 272. The connection system 338 is programmed to retain the first user request 646 from the first user 650 and to retain the second user request 660 from the second user 662 as well as to retain the first user response 654 from the single remote device 648 and to retain the second user response 666 from the single remote device. The connection system 338 therefore manages the flow of requests and responses between the multiple users and the multiple devices.

The connection system 514 is programmed to retain the first user response 654 initiated by the first user request 646 from the first user 650 in a cache memory 672 for a predetermined period of time, such as ten minutes, or until a cache memory limit 674 is exceeded. The second user request 660 sent from the second user 662 is processed by the connection manager 514 to initiate a cached form of the first user response 654 to be sent as the second user processed response 668. After the predetermined period of time is exceeded or the cache memory limit 674 is exceeded, the first user response 654 is erased from the cache memory 672.

Data Flow Summary

The user configures the user computer to connect to the host server by one of the methods described above and initiates the user program running on the user computer. The user enters the unique name and password recognized by the host server program as being registered in the user directory. The connection manager sends a device list to the user computer that includes a list of registered remote devices to which the user may connect. The user selects the desired remote devices from the list and sends a request to the connection system initiating the construction manager to open a connection to the desired remote devices. The connection manager initiates a series of dial-out sequences by activating the telephone line sockets in the host modem pool and establishing multiple telephone line connections to the requested remote devices. The connection manager establishes a separate PPP connection between the host modem pool and each of the requested remote devices. A concurrent user-device communication connection is therefore established between the user computer and multiple remote devices. Multiple users likewise access the host server and are connected to requested remote devices.

Requests and responses are therefore transmitted between multiple user computers and multiple remote devices.

Automatic Disconnect

As described above, the connection manager 514 provides access for registered users such as found in the registered user list 606 to a registered remote device such as found in the registered device list 604. The connection manager 514 then monitors a communication link between the registered device and its associated registered users 606. When the communication link between the last of the associated registered users and their associate device is terminated, the connection system 338 disconnects the device-host communication link 442 between the host server modem pool 246 and the device modem 398.

The connection system 338 monitors a chronograph that is initiated when a last response is sent from a device to the last user. The connection system 338 disconnects the device-host communication link 442 between the host server modem pool 246 and the device modem 398 after a predetermined period of time (such as ten minutes) has elapsed after the last response 684 is sent.

Direct Broadband Connection to Remote Device

In another implementation, a device server connects directly to a host server computer over a second broadband communication link, such as a network connection including the Internet or a WAN. The device server is running server software such as Apache, Microsoft Server or other server software known by one skill in the art. The device server is connected to a fifth broadband connection such as a T-1 or T-3 line using an appropriate protocol such as point-of-presence (POP). The host server computer running a broadband user program initiates a Uniform Resource Locator (URL) search.

The device server is assigned a unique URL address and is connected to a sixth broadband connection such as a T-1 or T-3 line providing high-speed data access to a communication network such as the Internet. The host server computer is programmed to establish the second broadband communication link with the device server.

The host server computer sends a set of data over the second broadband communication link to the device server. A broadband device-host server communication link is therefore established between the device server and the host server computer.

In an alternative implementation, the device server is communicatively linked to a telephone network system, such as the PSTN 112, through a dedicated line such as a DSL, T1, T3, cellular, satellite link, broadband cable, or other dedicated line known in the art. For instance, the device modem 398 could be replaced by a DSL modem. Similarly in alternative implementations, the host server 242 can be directly connected through T1, T3, DSL or other dedicated lines to a telephone network. For instance, the host modem pool 246 could be replaced by a single or multi-port DSL modem. Methods known in the art are used to establish direct dedicated connections through a telephone network.

The following examples are provided to further illustrate aspects of some of the implementations discussed above rather than somehow limiting the scope of the invention.

Exemplary Implementation—User Requesting Image from a Remote Camera

Figure 8:
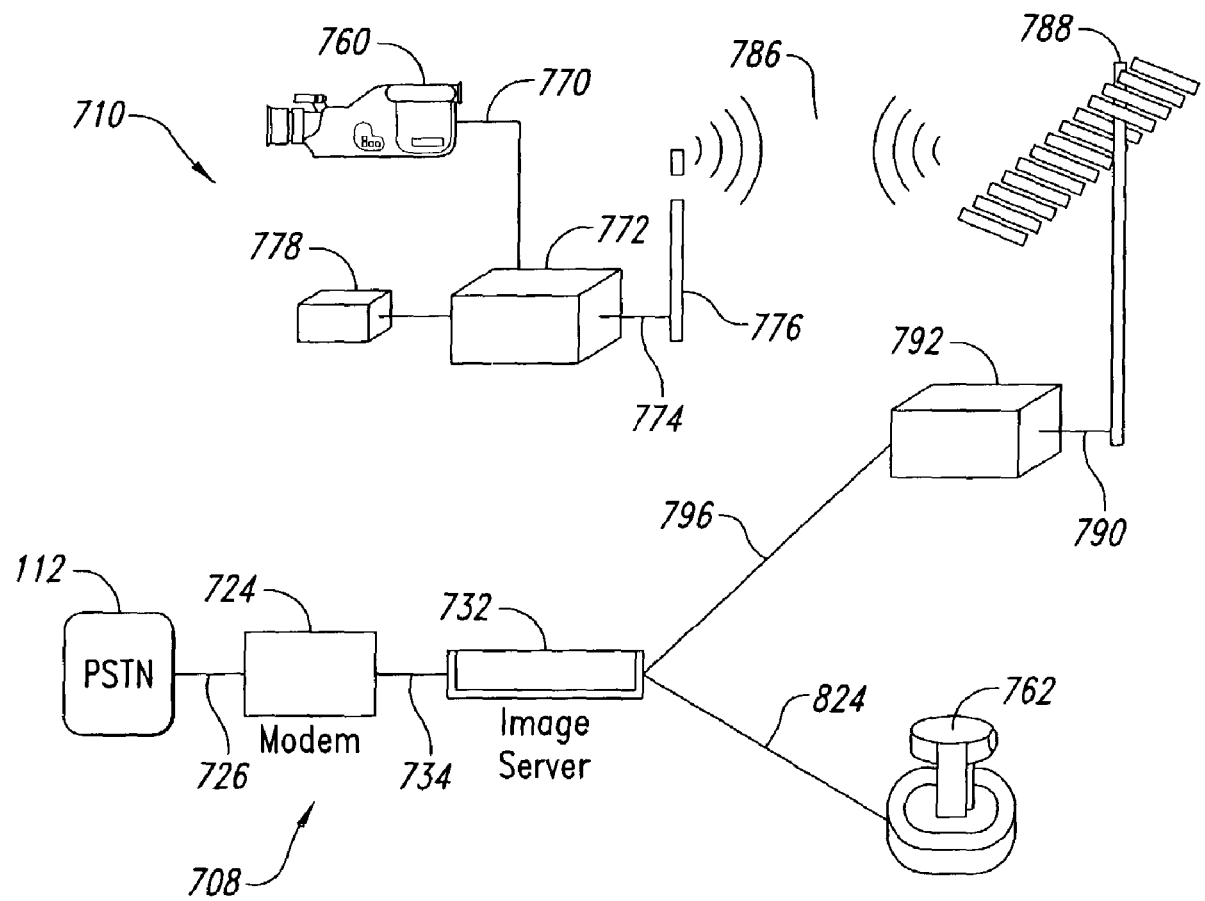
FIG. 8 is a schematic diagram illustrating exemplary implementations of remote device connections to the system as illustrated in FIG. 1.

An implementation of the connection system for providing concurrent telephone line connections to multiple remote devices from a central server accessible over a communications network such as the Internet is shown in FIG. 8.

A first construction project is equipped with a first remote device 708 described generally above at a first construction job site. An implementation of the host server 242 is programmed to connect to a designated set of multiple users such as an architect, engineer, and contractor to the first remote device 708 as described generally above. Each user is registered on a user data card programmed into a version of the user directory 512 as a first registered user, a second registered user, and so on as described generally above.

The first remote device 708 is comprised of a device modem 724 connected to a device modem telephone line 726 such as a standard telephone line in the public switched telephone network 112. The device modem telephone line 726 may be connected to a tone router that is programmed to recognize an incoming modem tone and route the modem tone to the device modem 724 when the device modem telephone line is also used to receive normal telephone calls and fax transmissions. Alternatively, as described above, the device modem 724 could be a dedicated modem such as for a DSL line. The device modem 724 is programmed with a device modem TCP/IP protocol stack and is assigned a unique telephone number.

The device modem 724 is connected to an image server 732 with a modem-server communication connection 734 described above. The image server 732 is assigned a unique IP address and programmed to respond to operational requests. The unique telephone number, the device modem TCP/IP protocol stack, and the unique IP address are registered on a device data card programmed into a version of the device directory 516 as described generally above. An implementation of the connection manager 514 lists the remote device 708 as the first registered device 520 in the user access information 537 programmed on the user data cards for the first registered user 532 and the second registered user 534. In this exemplary implementation, the connection manager 514 likewise lists the designated set of multiple users in the as registered users list 606 in the device access information 525 programmed on the device data card 574 for the first remote device 708.

In this exemplary implementation, the host server 242 runs the host server program 320 and is operationally configured to maintain a user-host server communication link to registered users and initiate a multiple device-host communication link with the first registered device 520 as described generally above.

The first registered device 520 is also comprised of a set of connected devices. In this implementation, the connected devices are a first hand held camera 760 and a first fixed location-operable camera 762, both shown in FIG. 8. Each of the cameras 760 and 762 is assigned a unique device address distinguishable by the image server 732.

The first hand held camera 760 is operated by a remote operator such as a foreman on the first construction job site 710. The remote operator is equipped with a standard cellular telephone as is well known in the industry to communicate with one or more of the registered users associated with one or more of the cameras 760 and 762.

The first hand held camera 760 is connected by a camera-transmitter communication link 770 such as by a first standard RCA connection to a transmitter 772. The transmitter 772 is connected with a transmitter-antenna communication link 774 such as an antenna cable to a transmitting antenna 776 and to a portable power supply 778 such as a 12 V DC battery. The first hand held camera 760 is programmed to capture a first desired remote image and output a first image signal across the camera-transmitter communication link 770 to the transmitter 772. The transmitter 772 is programmed to process the first image signal as a first transmittable signal as well known in the industry. The transmitter 772 sends the first transmittable signal across the transmitter-antenna communication link 774 to the transmitting antenna 776. The transmitting antenna 776 is operationally configured to transmit the first transmittable signal as a unique transmitted signal 786 as is well known in the industry.

A receiving antenna 788 is centrally located at the first construction job site 710 and connected by a receiver-antenna communication link 790 such as by a second standard antenna cable to a receiver 792. The receiving antenna 788 is operationally configured to receive the unique transmitted signal 786 sent from the transmitting antenna 776. The receiving antenna 788 sends the unique transmitted signal 786 across the receiver-antenna communication link 790 to the receiver 792 as is well known in the industry.

The receiver 792 is programmed to process the unique transmitted signal 786 as a second image signal as is well known in the industry. The receiver 792 is connected to the image server 732 with a receiver-server communication link 796 such as by a second standard RCA connection. The receiver 792 is programmed to send the second image signal across the receiver-server communication link 796 to the image server 732.

The image server 732 is connected to the device modem 724 with the server-modem communication connection 734. The image server 732 is programmed to receive the second image signal from the receiver 792, process the second image signal as a compressed image such as a JPEG or MPEG image as well known in the art. The image server 732 is programmed to push the compressed image across the server-modem communication connection 734 to the device modem 724 upon receiving a request 800 from one or more the registered users. The device modem 724 is operationally programmed to answer an incoming telephone call and send the compressed image onto the device modem telephone line 726.

One of the registered users such as the architect, engineer, and the contractor, can then contact the cellular telephone of the remote operator and direct the remote operator to capture a first desired remote image with the hand held camera 760. This registered user also can operate a user computer to initiate a user-host server communication link with the host server 242 as described generally above. The user computer being used by one of the registered users sends a connect request signal to the connection manager 514. The connection manager 514 then sends a user registration request to the user computer. The user enters their user name and a user password and sends a user registration response to the connection manager 514. The connection manager 514 matches the user name and user password with the user data card programmed in the user directory 512.

The connection manager 514 sends a registered device list to the user computer. The user selects the first registered device 570 corresponding to the first hand held camera 760 operated by the remote operator. A version of the connection system 338 programmed as part of the host server software 320 initiates a device-host communication link as described generally above. The device modem 724 answers the incoming telephone call and connects to the host server 242. The registered user sends an operational request to the image server 732 to connect to the first hand held camera 760. The image server 732 sends the first desired image across the modem-server communication link to the device modem 724. The device modem 724 sends the image to the registered user. The registered user 748 therefore has access to the image generated by the first hand held camera 760.

A fixed-operable camera 762 is connected to the image server 732 with a packet-based network connection 824 such as an Ethernet IEEE 802, CAT 5 connection or wireless computer communication system and operationally programmed to respond to an operational request such as a request to rotate the camera to fix a known image.

The registered user sends a first operational request to the image server 732 to connect to the fixed-operable camera 762. The registered user 748 sends a second operational request to the fixed-operable camera 762 to establish and fix a known image coordinate. A third operational request to capture an image is sent from the registered user to the fixed-operable camera 762. The fixed-operable camera 762 captures the image and sends an image signal to the image server 732 across the packet-based network connection 824. The image server 732 compresses the image signal as described above and sends the compressed signal across the modem-server communication link 734 to the device modem 724. The device modem 724 sends a compressed signal to the registered user. The registered user is therefore has access to the image generated by the fixed-operable camera.

In another depicted implementation, the image server 732 is connected to a digital cellular modem with a server-digital cellular modem communication link. The digital cellular modem is operationally connected to a digital cellular network and configured to send a distinctive digital cellular signal onto the digital cellular network. An image generated by the hand held camera 760 is sent to the image server 732 as described generally above. The image server 732 is programmed to send the image to the digital device modem and onto the digital cellular network as a distinctive signal. A host server is configured to receive distinctive signals from the digital cellular network as described above. Therefore, the image captured by the hand held camera 760 is likewise transmitted over the digital cellular network to the user.

A second construction project is likewise equipped with a second remote device as described above at a second construction job site. The second remote device is registered in the user access information programmed on the user data card for each registered user. The second remote device is comprised of components similar to those described above for the first construction site 710. Consequently, a registered user has access to the second construction job site.

A construction problem occurs on the first construction job site 710. The registered user such as the architect wishes to compare a first project condition on the first construction job site 710 with a second project condition on the second construction job site.

The connection manager 514 is programmed to maintain multiple user-host server connections and is programmed to recognize a registered device that is connected to a host modem pool and capable of receiving and transmitting data.

The connection manager 514 is likewise programmed to maintain multiple device-host communication links and to recognize which registered users are connected to the host server 242 and capable of receiving and transmitting data.

The connection manager 514 routes requests and responses between a user and multiple remote devices. A corresponding description of the connection manager 514 routing requests and responses between a user and multiple remote devices is shown in FIG. 7A and 7B.

A first request such as a first get project condition image request intended for a first device such as the first hand held camera 760 located at the first construction job site 710 is sent by a first user such as the architect to the connection system 338 where the request is processed by a connection manager 514. The connection manager 514 sends a first processed request to the first device. A second request such as a second get project condition image request intended for a second device such as a second hand held camera located at the second construction job site is sent by the first user to the connection system 338 where the second request is processed by the connection manager 514. The connection manager 514 sends a second processed request to the second device.

The first device sends a first response such as a first captured image of the first project condition back to the connection system 338 where the first response is processed by the connection manager 514. The connection manager 514 sends a first processed response to the first user.

The second device sends a second response such as a second captured image the second project condition to the connection system 338 where the second response is processed by the connection manager 514. The connection manager 514 transmits a second processed response to the first user after the first processed response has been sent from the connection manager 514 to the first user.

The architect is therefore able to compare the first captured image from the first project condition with the second captured image from the second project condition using concurrent telephone line connections to multiple remote devices from a central server accessible over a communications network such as the Internet.

A construction problem occurs on the first construction job site. The architect wishes to collaborate on a project condition with the contractor in an effort to expediently solve the construction problem.

The connection manager 514 routes requests and responses between multiple users and a remote device. A corresponding description of the connection manager 514 routing requests and responses between multiple users and a remote device is shown in FIG. 7A and 7B.

A first request such as a first get project condition image intended for a second device such as a fixed-operable camera is sent by a first user such as the architect to the connection system 338 where the request is processed by the connection manager 514. The connection manager 514 sends a first processed request to the second device. The second device sends a first response to the connection system 338 where the response is processed by the connection manager 514. The connection manager 514 sends a first processed response to the first user. The connection manager 514 therefore knows the status of a first user-second device connection. The connection manager 514 is programmed to open a second device communication connection link to the PPP connection of the requested remote device as shown in FIG. 4.

A second request such as a second get project condition image intended for the second device is sent by a second user such as the contractor to the connection system 338 where the second request is processed by the connection manager 514.

The connection manager 514 determines that the second device is concurrently connected to the host server modem pool 246. The connection manager 514 transmits a second processed request to the second device after the first response has been sent from the second device to the connection manager. A second response from the second device is sent back to the connection system 338 where it is processed by the connection manager 514. The connection manager 514 sends a second processed response to the second user after the first processed response has been sent from the connection manager 514 to the first user. The connection manager 514 therefore maintains multiple user connections to a single remote device. The architect and the contractor are therefore able to collaboratively use the captured image of the project condition using concurrent telephone line connections to multiple remote devices from a central server accessible over a communications network such as the Internet.

EXAMPLE 2

User Requesting Data from Remote Sensors

Figure 9:
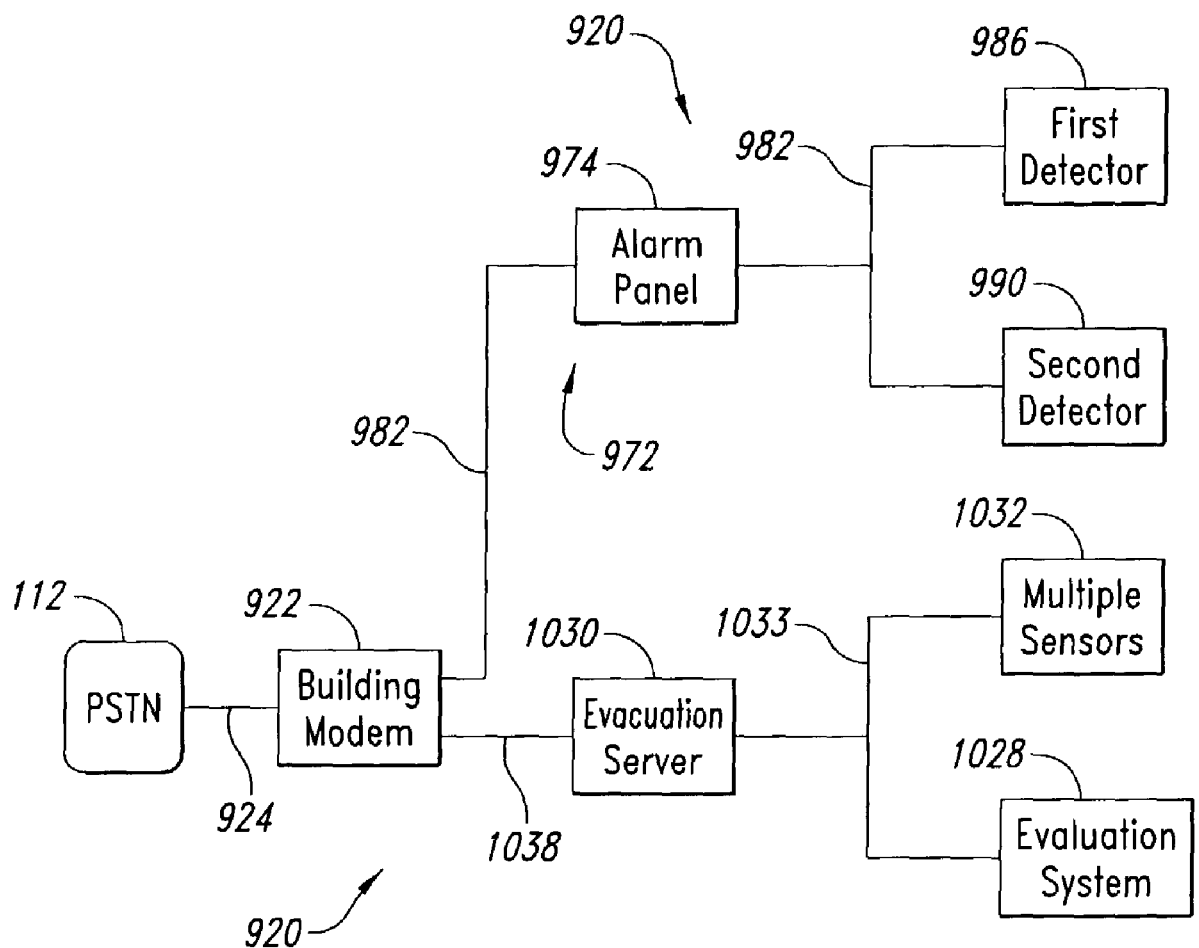
FIG. 9 is a schematic diagram illustrating alternate exemplary implementations of remote device connections to the system as illustrated in FIG. 1.

An alternate implementation of the connection system to provide concurrent telephone line connections to multiple remote devices from a central server accessible over a computer network such as the Internet is shown in FIG. 9. A building is equipped with critical life safety features connected to a standard telephone line and is comprised of a standard fire alarm system comprising a network of smoke detectors; an elevator evacuation system, a network of automatic air flow dampers and the like. Data generated by these critical life safety features is accessible by the fire department over the Internet. Operational requests are likewise sent by the fire department to the critical life safety features to affect critical operations.

A first remote building device 920 is comprised of a critical building systems modem 922 connected to a building systems telephone line 924 such as a standard telephone line or a dedicated line, such as a DSL, T1, or T3 line, in a telephone network, such as the public switched telephone network 112. The critical building systems modem 922 is programmed with a building systems TCP/IP protocol stack and is assigned a unique telephone number. The critical building systems modem 922 is programmed to initiate a dial-out connection in the event of a building fire. The critical building systems modem 922 is likewise programmed to answer an incoming telephone call and connect to a host modem pool.

The critical building systems modem 922 is connected to a set of remote building device servers each connected to a modem-server communication connection as described generally above. Each building server is assigned a unique IP address and programmed to respond to an operational request. The unique telephone number, the critical building systems modem TCP/IP protocol stack, and the unique IP addresses are registered on a device data card programmed into a device directory as described above. The connection manager 338 lists the multiple building device servers as a first registered server, a second registered server, and so on in a set of user access information programmed on a user data card. The connection manager 514 likewise lists a set of multiple users as a set of registered users in a set of device access information programmed on each device data card such as a first registered user; a second registered user; and so on.

A first building device 970 is comprised of a fire alarm system 972 with a fire alarm panel 974 and a set of remotely distributed sensors such as a plurality of smoke detectors located throughout a building. Each smoke detector is connected by a first device-server communication network to the fire alarm panel 974 as is well known in the industry. Each individual smoke detector is assigned a unique device address such a sequential series of addresses corresponding to the sequential series of individual smoke detectors that are identifiable by the fire alarm panel such as a first smoke detector 986 assigned a first device address; a second smoke detector 990 assigned a second device address; and so on. Consequently, the fire alarm panel 974 can distinguish the remotely distributed sensors as the first smoke detector 986, the second smoke detector 990, and so on.

The fire alarm panel 974 is connected by a first modem-server communication connection to the critical building systems modem 922. The fire alarm panel 974 is programmed with a unique identifier such as a first unique IP address identifiable by the connection manager 514.

The smoke detectors are programmed to detect the presence of smoke or products of combustion during a building fire and send an alarm signal to the fire alarm panel 974 as is well known in the industry. The fire alarm panel 974 is programmed to recognize a status of the individual smoke detectors and identify the unique device address of the first smoke detector 986 that initiated the alarm signal. The fire alarm panel 974 is programmed to activate the critical building system modem 922 upon receiving an alarm signal from a first smoke detector 986. The critical building systems modem 922 is programmed to dial a unique telephone number of a local fire department and establish a critical system-fire department communication link.

In the alternate embodiment, a host server as described above is located at the local fire department. The fire alarm panel 974 is programmed to transmit the status of the smoke detectors over the critical system-fire department communication link to the host server. A connection system on the host server, in accordance with aspects described herein, is programmed to transmit the status received from the fire alarm panel 974 to a set of registered users identified in the device directory of the connection manager 514 as described generally above.

According to this exemplary illustration, an emergency vehicle of the local fire department is equipped with a laptop computer that is connected to a communication network such as the Internet with a digital cellular modem. A digital cellular user program is configured to connect to the host server and to initiate a request of the status of the smoke detectors in a burning building.

A second building device is comprised of a generally known elevator evacuation system 1028, an elevator evacuation server 1030 and a set of multiple sensors 1032 programmed to monitor the current status 1034 of the elevator evacuation system 1028. The multiple sensors 1032 and the elevator evacuation system 1028 are connected with a second device-server communication network 1033 to the elevator evacuation server 1030. The elevator evacuation server 1030 is given a unique identifier such as a second unique IP address identifiably by the connection manager 514 and is connected by a second modem-server communication connection 1038 to the critical building systems modem 922. The elevator evacuation system 1028 is programmed to transmit the status of the elevator system 1028 to the critical building systems modem 922 as described above. The status of the elevator evacuation system 1028 is therefore accessible by the local fire department as they arrive at the burning building in the emergency vehicle.

The local fire department sends an operational request to change a evacuation protocol by activating a user software running on the laptop in the emergency vehicle. The operational request is sent by the digital cellular modem to the connection manager 514 as described generally above. The connection manager 514 sends the operational request to the critical building system modem 922. The critical building system modem 922 sends the request to the elevator evacuation server 1030. The server 1030 sends the operational request to the elevator evacuation system 1028. The elevator evacuation system 1028 automatically modifies the elevator evacuation system protocol in accordance with the operational request. The fire department is therefore capable of monitoring and controlling building systems from the emergency vehicle.

A second building is likewise equipped with a second remote device as described above. The second remote device is registered in the user access information programmed on the user data card for each registered user. The second remote device is comprised of components similar to those described above for the first building. Registered users are communicatively linked to the second building.

The connection manager 514 is programmed to maintain multiple user-device connections and is programmed to recognize which registered remote devices are connected to the host modem pool 246 and capable of receiving and transmitting data. The connection manager 514 is likewise programmed to recognize which registered users are connected to user-host server communication link and capable of receiving and transmitting data.

The connection manager 514 routes requests and responses between a user and multiple remote devices. A corresponding description of the connection manager 514 routing requests and responses between a user and multiple remote devices is shown in FIGS. 7A and 7B.

A first request such as a get-status request intended for a first device such as the first fire alarm panel in the first building is sent by a first user such as the fire department to the connection system 338 where the first request is processed by the connection manager 514. The connection manager 514 sends a first processed request to the first device. A second request such as a get-status request intended for a second device such as a second fire alarm panel in the second building is sent by the first user to the connection system 338 where the second request is processed by the connection manager 514. The connection manager 514 sends a second processed request to the second device.

The first device sends a first response back to the connection system 338 where the response is processed by the connection manager 514. The connection manager 514 sends a first processed response to the first user.

The second device sends a second response to the connection system 338 where the response is processed by the connection manager 514. The connection manager 338 transmits a second processed response to the first user after the first processed response has been sent from the connection manager 514 to the first user.

The connection manager 514 therefore maintains multiple device connections to a single user. Systems and methods for data management involving synchronous and asynchronous data flow, queuing data on a spooler, and other methods are well known and within the scope of this patent.

The fire department is therefore able to compare the first set of building data from the first building condition with the second set of building data from the second building condition using concurrent telephone line connections to multiple remote devices from a central server accessible over a communications network such as the Internet.

A building fire occurs at the first building. The fire department wishes to collaborate on a building condition with the building engineer in an effort to expediently extinguish the fire.

The connection manager 514 routes requests and responses between multiple users and a remote device. A corresponding description of the connection manager 514 routing requests and responses between multiple users and remote devices is shown in FIGS. 7A and 7B.

Registered users listed in the device directory 516 connect to the host server 242 as described above. A second registered user such as a building engineer connects to the host server 242 as described above.

A first request such as a get-status request intended for a second device such as the elevator evacuation system is sent by a first user such as the fire department to the connection system 338 where the request is processed by the connection manager 514. The connection manager 514 sends a first processed request to the second device. The second device sends a first response to the connection system 338 where the response is processed by the connection manager 514. The connection manager 514 sends a first processed response to the first user. The connection manager 514 therefore knows the status of a first user-second device connection. The connection manager 514 is programmed to open a second device communication connection link to the PPP connection of the requested remote device as described above.

A second request intended for the second device is sent by a second registered user such as the building engineer to the connection system 338 where the request is processed by the connection manager 514.

The connection manager 514 determines that the second device is concurrently connected to the host server modem pool 246. The connection manager 514 transmits a second processed request to the second device after the first response has been sent from the second device to the connection manager 514. A second response from the second device is sent to the connection system 338 where it is processed by the connection manager 514. The connection manager 514 sends a second processed response to the second user after the first processed response has been sent from the connection manager 514 to the first user. The connection manager 514 therefore maintains multiple user connections to a single remote device.

The connection manager 514 therefore maintains multiple user connections to a single remote device. The fire department and the building engineer are therefore able to collaboratively use the data from the building using concurrent telephone line connections to multiple remote devices from a central server accessible over a communications network such as the Internet.

Those having ordinary skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having ordinary skill in the art will appreciate that there are various vehicles by which processes and/or systems described herein can be effected (e.g., hardware, software, and/or firmware), and that the preferred vehicle will vary with the context in which the processes are deployed. For example, if an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary.

The foregoing detailed description has set forth various embodiments of the devices and/or processes via the use of block diagrams, flowcharts, and examples. Insofar as such block diagrams, flowcharts, and examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof. In one embodiment, the present invention may be implemented via Application Specific Integrated Circuits (ASICs). However, those skilled in the art will recognize that the embodiments disclosed herein, in whole or in part, can be equivalently implemented in standard Integrated Circuits, as one or more computer programs running on one or more computers (e.g., as one or more programs running on one or more computer systems), as one or more programs running on one or more controllers (e.g., microcontrollers) as one or more programs running on one or more processors e.g., microprocessors, as firmware, or as virtually any combination thereof, and that designing the circuitry and/or writing the code for the software and or firmware would be well within the skill of one of ordinary skill in the art in light of this disclosure. In addition, those skilled in the art will appreciate that the mechanisms of the present invention are capable of being distributed as a program product in a variety of forms, and that an illustrative embodiment of the present invention applies equally regardless of the particular type of signal bearing media used to actually carry out the distribution. Examples of signal bearing media include, but are not limited to, the following: recordable type media such as floppy disks, hard disk drives, CD ROMs, digital tape, and computer memory; and transmission type media such as digital and analogue communication links using TDM or IP based communication links (e.g., packet links).

In a general sense, those skilled in the art will recognize that the various embodiments described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and electrical circuitry forming a communications device (e.g., a modem, communications switch, or optical-electrical equipment).

Those skilled in the art will recognize that it is common within the art to describe devices and/or processes in the fashion set forth herein, and thereafter use standard engineering practices to integrate such described devices and/or processes into data processing systems. That is, the devices and/or processes described herein can be integrated into data processing systems via a reasonable amount of experimentation.

With reference now again to FIGS. 1 and 2, depicted are pictorial representations of conventional data processing systems in which portions of the illustrative embodiments of the devices and/or processes described herein may be implemented. It should be noted that graphical user interface systems (e.g., Microsoft Windows operating systems) and methods can be utilized with the data processing system depicted in FIGS. 1 and 2. The data processing systems depicted include at least system unit housings, video display devices, keyboards, mice, and microphones. The data processing systems may be implemented utilizing any suitable commercially available computer system.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. For example, although embodiments herein have been shown in the context of data processing devices running client-server software, the teachings herein have been shown, in part, to extend to the use of wireless devices (e.g., web-enabled wireless phones, or wireless personal digital assistants), or other types of computational devices (e.g., DirecTV devices, or personal digital assistants), without undue experimentation.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. For communication between a plurality of user computers and a plurality of devices, the plurality of user computers being communicatively linked to a computer network, each of the plurality of devices being communicatively linked to a telephone system by a modem coupled to a telephone connection, each modem having a modem telephone number, each of the plurality of devices being not directly connected to the computer network, a method comprising:

receiving a user identification of a first computer user who is using a first user computer communicatively linked to the computer network;

verifying, from the provided user identification for the first computer user, that the first computer user is authorized and if so, establishing a first user-host communication link between the first user computer and a host computer via the computer network;

determining a first set of the devices that the first computer user is authorized to access, the first set comprising a plurality, if not all, of the plurality of devices;

using device access information, including the modem telephone number of each of the first set of the devices, from a directory located on a computer other than any of the plurality of user computers to direct a modem pool coupled to the telephone system to establish first host-device communication links via the telephone system with the first set of the devices, with the first host-device communication links being concurrent with the first user-host communication link and providing simultaneous access for the first user computer to the first set of devices via the first user-host communication link;

receiving a user identification of a second computer user who is using a second user computer that is communicatively linked to the computer network;

verifying, from the provided user identification for the second computer user, that the second computer user is authorized and if so, establishing a second user-host communication link between the second user computer and the host computer via the computer network, the second user-host communication link being coincident with the first user-host communication link;

determining a second set of the devices that the second computer user is authorized to access, the second set comprising a plurality, if not all, of the plurality of devices; and using device access information, including the modem telephone number of each of the second set of the devices, from a directory located on a computer other than any of the plurality of user computers to direct the modem pool coupled to the telephone system to establish second host-device communication links via the telephone system with the second set of the devices, with the second host-device communication links being concurrent with the second user-host communication link and providing access for the second user computer to the second set of devices via the second user-host communication link, and the second host-device communication links being concurrent with the first host-device communication links.

2. The method of claim 1, further comprising if the first computer user is verified as authorized, sending to the first user computer a registered device list listing devices that the first computer user is authorized to access.

3. The method of claim 2, further comprising selecting from the registered device list those devices desired to be accessed by the first computer user.

4. The method of claim 1 wherein establishing second host-device communication links further includes verifying for each of the second set of devices whether an active first host-device communication link already exists and if so, using the active first host-device communication link as the second host-device communication link for the device.

5. The method of claim 1 wherein the first and second user-host communication links and the first and second host-device communication links are PPP connections.

6. The method of claim 1 wherein determining which of the devices can be accessed by the first computer user is based upon information stored in a user directory on the host computer.

7. The method of claim 1, further comprising identifying user-host communication links and the host-device communication links that have an absence of traffic for a predetermined duration and inactivating the so identified communication links.

8. The method of claim 1, wherein the second host-device communication links provide simultaneous access for the second user computer to the second set of devices via the second user-host communication link.

9. A computer recordable medium whose contents cause a host computer to support communication between a plurality of user computers and a plurality of devices, the plurality of user computers being communicatively linked to a computer network, the plurality of devices being communicatively linked to a telephone system, by:

coupling a separate modem to each of the plurality of devices, the separate modem being coupled to a separate telephone connection with the telephone system, each modem having a modem telephone number, each of the plurality of devices being not directly connected to the computer network;

receiving a user identification of a first computer user who is using a first user computer communicatively linked to the computer network;

verifying, from the provided user identification for the first computer user, that the first computer user is authorized and if so, establishing a first user-host communication link between the first user computer and the host computer via the computer network;

determining a first set of the devices that the first computer user is authorized to access, the first set comprising a plurality, if not all, of the plurality of devices;

using device access information, including the modem telephone number of each of the first set of the devices, from a directory located on a computer other than any of the plurality of user computers to direct a modem pool coupled to the telephone system to establish first host-device communication links via the telephone system with the first set of the devices, with the first host-device communication links being concurrent with the first user-host communication link and providing simultaneous access for the first user computer to the first set of devices via the first user-host communication link;

receiving a user identification of a second computer user who is using a second user computer that is communicatively linked to the computer network;

verifying, from the provided user identification for the second computer user, that the second computer user is authorized and if so, establishing a second user-host communication link between the second user computer and the host computer via the computer network, the second user-host communication link being coincident with the first user-host communication link;

determining a second set of the devices that the second computer user is authorized to access, the second set comprising a plurality, if not all, of the plurality of devices; and using device access information, including the modem telephone number of each of the second set of the devices, from a directory located on other than any of the plurality of user computers to direct the modem pool coupled to the telephone system to establish second host-device communication links via the telephone system with the second set of the devices, with the second host-device communication links being concurrent with the second user-host communication link and providing access for the second user computer to the second set of devices via the second user-host communication link, and the second host-device communication links being concurrent with the first host-device communication links.

10. The computer recordable medium of claim 9, wherein establishing the second host-device communication links further includes verifying for each of the second set of devices whether an active first host-device communication link already exists and if so, using the active first host-device communication link as the second host-device communication link for the device.

11. The computer recordable medium of claim 9, wherein the first and second user-host communication links and the first and second host-device communication links are PPP connections.

12. The computer recordable medium of claim 9, wherein determining which of the devices can be accessed by the first computer user is based upon information stored in a user directory on the host computer.

13. The computer recordable medium of claim 9, wherein the second host-device communication links provide simultaneous access for the second user computer to the second set of devices via the second user-host communication link.

* * * * *